(12) United States Patent
Awazu et al.

(10) Patent No.: US 10,895,756 B2
(45) Date of Patent: Jan. 19, 2021

(54) IMAGE SHAKE CORRECTION DEVICE, IMAGING DEVICE, POSITION DETECTION METHOD, POSITION DETECTION PROGRAM

(71) Applicant: FUJIFILM Corporation, Tokyo (JP)

(72) Inventors: Kohei Awazu, Saitama (JP); Yasuhiro Miwa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/912,676

(22) Filed: Jun. 25, 2020

(65) Prior Publication Data

US 2020/0326557 A1 Oct. 15, 2020

Related U.S. Application Data

(63) Continuation of application No. PCT/JP2018/048299, filed on Dec. 27, 2018.

(30) Foreign Application Priority Data

Dec. 28, 2017 (JP) ................. 2017-254229

(51) Int. Cl.
*G02B 27/64* (2006.01)
*H04N 5/232* (2006.01)
*G02B 7/182* (2006.01)

(52) U.S. Cl.
CPC ......... *G02B 27/646* (2013.01); *G02B 7/1828* (2013.01); *H04N 5/23287* (2013.01)

(58) Field of Classification Search
USPC ........................................................... 396/55
See application file for complete search history.

(56) References Cited

U.S. PATENT DOCUMENTS

2007/0141920 A1* 6/2007 Mogamiya ............... G03B 3/04
439/752
2007/0222544 A1* 9/2007 Seo .................... H04N 5/23248
335/285
(Continued)

FOREIGN PATENT DOCUMENTS

CN 106959568 A 7/2017
CN 107343139 A 11/2017
(Continued)

OTHER PUBLICATIONS

International Search Report issued in PCT/JP2018/048299; dated Apr. 9, 2019.
(Continued)

*Primary Examiner* — Rodney E Fuller
(74) *Attorney, Agent, or Firm* — Studebaker & Brackett PC

(57) ABSTRACT

Data sets DS4 to DS6 each consisting of plural linear functions obtained by approximating an output characteristic of a Y-axis rotation position detection Hall element H2 and a data set DS2 consisting of plural linear functions obtained by approximating an output characteristic of an and the X-axis position detection Hall element H1 are stored for each of plural positions in a direction X in a ROM of a memory. A system controller detects a position of a movable member in the direction X based on the data set DS2 and an output signal of the X-axis position detection Hall element H1, then selects the data set corresponding to the position among the data sets DS4 to DS6, and detects a position of the movable member in a direction Y based on the selected data set and an output signal of the Y-axis rotation position detection Hall element H2.

16 Claims, 21 Drawing Sheets

(56) References Cited

U.S. PATENT DOCUMENTS

| | | | |
|---|---|---|---|
| 2008/0151063 A1* | 6/2008 | Mogamiya | H04N 5/2253 |
| | | | 348/208.2 |
| 2008/0225126 A1* | 9/2008 | Mogamiya | H04N 5/2253 |
| | | | 348/208.4 |
| 2011/0043646 A1 | 2/2011 | Watanabe et al. | |
| 2013/0194442 A1* | 8/2013 | Yazawa | H04N 5/23258 |
| | | | 348/208.7 |
| 2015/0015729 A1 | 1/2015 | Kasamatsu | |
| 2015/0229842 A1 | 8/2015 | Kasamatsu | |
| 2016/0050373 A1* | 2/2016 | Nakamura | H04N 5/2254 |
| | | | 348/208.11 |
| 2017/0176765 A1 | 6/2017 | Sueoka | |

FOREIGN PATENT DOCUMENTS

| | | |
|---|---|---|
| JP | 2000-039303 A | 2/2000 |
| JP | 2006-284415 A | 10/2006 |
| JP | 2009-180990 A | 8/2009 |
| JP | 2010-160310 A | 7/2010 |
| JP | 2010-191210 A | 9/2010 |
| JP | 2017-097109 A | 6/2017 |

OTHER PUBLICATIONS

Written Opinion issued in PCT/JP2018/048299; dated Apr. 9, 2019.
An Office Action mailed by the State Intellectual Property Office of the People's Republic of China dated Oct. 22, 2020, which corresponds to Chinese Patent Application No. 201880084039.2 and is related to U.S. Appl. No. 16/912,676; with English language translation.

* cited by examiner

FIG. 12

| Y-AXIS ROTATION POSITION DETECTION HALL ELEMENT H2 | POSITION IN DIRECTION X | x1 | x2 | x3 |
|---|---|---|---|---|
| | DIVISION REGION RG1 | FUNCTION F11 | FUNCTION F12 | FUNCTION F13 |
| | DIVISION REGION RG2 | FUNCTION F21 | FUNCTION F22 | FUNCTION F23 |
| | DIVISION REGION RG3 | FUNCTION F31 | FUNCTION F32 | FUNCTION F33 |
| | | ↖ DS4 | ↖ DS5 | ↖ DS6 |

FIG. 13

| Y-AXIS ROTATION POSITION DETECTION HALL ELEMENT H3 | POSITION IN DIRECTION X | x1 | x2 | x3 |
|---|---|---|---|---|
| | DIVISION REGION RG1 | FUNCTION F41 | FUNCTION F42 | FUNCTION F43 |
| | DIVISION REGION RG2 | FUNCTION F51 | FUNCTION F52 | FUNCTION F53 |
| | DIVISION REGION RG3 | FUNCTION F61 | FUNCTION F62 | FUNCTION F63 |

← DS7  ← DS8  ← DS9

IMAGE SHAKE CORRECTION DEVICE, IMAGING DEVICE, POSITION DETECTION METHOD, POSITION DETECTION PROGRAM

CROSS REFERENCE TO RELATED APPLICATION

This is a continuation of International Application No. PCT/JP2018/048299 filed on Dec. 27, 2018, and claims priority from Japanese Patent Application No. 2017-254229 filed on Dec. 28, 2017, the entire disclosures of which are incorporated herein by reference.

BACKGROUND OF THE INVENTION

1. Field of the Invention

The present invention relates to an image shake correction device, an imaging device, a position detection method, and a computer readable medium storing a position detection program.

2. Description of the Related Art

An imaging device comprising an imaging element that images a subject through an imaging optical system or a lens device used by being attached to the imaging device has an image shake correction function of correcting shake (hereinafter, referred to as image shake) of a captured image caused by vibration of the apparatus.

For example, in the lens device, image shake correction is performed by moving a correction lens included in an imaging optical system in a surface perpendicular to an optical axis such that the vibration of the apparatus is detected based on information from a motion detection sensor such as an acceleration sensor or angular velocity sensor mounted on the lens device and the detected vibration is canceled.

In the imaging device, the image shake correction is performed by moving one or both of the correction lens included in the imaging optical system and the imaging element on a surface perpendicular to an optical axis such that the vibration of the apparatus is detected based on information from a motion detection sensor such as an acceleration sensor or an angular velocity sensor mounted on the imaging device and the detected vibration is canceled.

JP2017-097109A and JP2010-191210A describe an image shake correction device that performs image shake correction by moving a lens.

SUMMARY OF THE INVENTION

In the image shake correction device, for example, at least two position detection elements are provided on a movable member, and four or more magnets including at least two drive magnets of the movable member and two position detection magnets of the movable member are provided in total at a support member that supports the movable member.

In this manner, in a case where a plurality of magnets is arranged so as to be close to each other, a magnetic field of the position detection magnet is disturbed by another magnet close to this magnet. Thus, a graph showing output characteristics (a relationship between the movement amount with respect to the magnet and an output signal level) of the position detection element provided on the movable member is not a straight line but a complicated curve.

The output characteristics are measured in advance, and a data table in which each of all acquirable positions of the movable member is associated with the output signal of the position detection element is stored. It is possible to perform accurate position detection by using this data table.

However, in a case where the resolution of position detection is increased, the capacity of this data table is increased. Thus, there is a burden of the memory capacity required for storing data. It is also considered that a curve showing the output characteristics of the position detection element obtained by actual measurement is approximated by a function such as a linear function and this function is stored instead of the data table. However, in such an approximate method, an approximate error is increased, and the accuracy of the position detection cannot be improved.

JP2017-097109A describes that a position of the movable member is detected by an approximate function from magnetic field information detected by the position detection element and the detected magnetic field information is converted into magnetic field information stored so as to correspond to the detected position. However, in this configuration, the output of the position detection element is corrected, and thus, there is a possibility that an error occurs in the position detection accuracy of the movable member.

JP2010-191210A describes that a plurality of pieces of data of the output characteristics of the position detection element is stored so as to correspond to a temperature, but it is not assumed that the output characteristics become a complicated curve.

The present invention has been made in view of the aforementioned circumstances, and an object of the present invention is to provide an image shake correction device capable of improving position detection accuracy of a movable member, an imaging device including the same, a position detection method, and a computer readable medium storing a position detection program.

There is provided an image shake correction device comprising a movable member to which a lens or an imaging element is fixed, a support member that supports the movable member in a movable manner in a first direction and a second direction perpendicular to each other along a plane, a first magnetic field detection element that detects a movement amount of the movable member in the first direction and a second magnetic field detection element that detects a movement amount of the movable member in the second direction, the first and second magnetic field detection elements being fixed to one of the movable member and the support member, a first magnet that faces the first magnetic field detection element, and a second magnet that faces the second magnetic field detection element, the first and second magnets being fixed to the other one of the movable member and the support member, a storage unit that stores a relationship between the movement amount of the movable member in the first direction and magnetic field information detected by the first magnetic field detection element, as a first set of linear functions corresponding to each division region in a case where a detection range of the magnetic field information detected by the first magnetic field detection element is divided into a plurality of division regions, stores the first set in association with each of a plurality of positions of the movable member in the second direction, and stores a relationship between the movement amount of the movable member in the second direction and magnetic field information detected by the second magnetic field detection element, as a second set of linear functions corresponding to each division region in a case where a detection range of the magnetic field information detected by the second magnetic field detection element is divided into a plurality of division regions, and a position detection unit that detects a position of the movable member in the second direction by using the magnetic field information detected by the second magnetic field detection element and the linear functions of the second set corresponding to the division region to which the magnetic field information belongs, and detects a position of the movable member in the first direction based on the position of the movable member in the second direction, the first set, and the magnetic field information detected by the first magnetic field detection element.

An imaging device of the present invention comprises the image shake correction device.

There is provided a position detection method of detecting a position of a movable member in an image shake correction device that includes the movable member to which a lens or an imaging element is fixed, a support member that supports the movable member in a manner where the movable member is movable in a first direction and a second direction perpendicular to each other along a plane, a first magnetic field detection element that detects a movement amount of the movable member in the first direction and a second magnetic field detection element that detects a movement amount of the movable member in the second direction, the first magnetic field detection element and the second magnetic field detection element being fixed to one of the movable member and the support member, and a first magnet that faces the first magnetic field detection element, and a second magnet that faces the second magnetic field detection element, the first magnet and the second magnet being fixed to the other one of the movable member and the support member. The method comprises a position detection step of reading out a second set of linear functions from a storage unit that stores a relationship between the movement amount of the movable member in the first direction and magnetic field information detected by the first magnetic field detection element, as a first set of linear functions corresponding to each division region in a case where a detection range of the magnetic field information detected by the first magnetic field detection element is divided into a plurality of division regions, stores the first set in association with each of a plurality of positions of the movable member in the second direction, and stores a relationship between the movement amount of the movable member in the second direction and magnetic field information detected by the second magnetic field detection element, as the second set of the linear functions corresponding to each division region in a case where a detection range of the magnetic field information detected by the second magnetic field detection element is divided into a plurality of division regions, detecting a position of the movable member in the second direction by using the magnetic field information detected by the second magnetic field detection element and the linear functions of the second set corresponding to the division region to which the magnetic field information belongs, and detecting a position of the movable member in the first direction based on the position of the movable member in the second direction, the first set read out from the storage unit, and the magnetic field information detected by the first magnetic field detection element.

There is provided a non-transitory computer readable medium storing a position detection program causing a computer to detect a position of a movable member in an image shake correction device that includes the movable member to which a lens or an imaging element is fixed, a support member that supports the movable member in a manner where the movable member is movable in a first direction and a second direction perpendicular to each other along a plane, a first magnetic field detection element that detects a movement amount of the movable member in the first direction and a second magnetic field detection element that detects a movement amount of the movable member in the second direction, the first magnetic field detection element and the second magnetic field detection element being fixed to one of the movable member and the support member, and a first magnet that faces the first magnetic field detection element, and a second magnet that faces the second magnetic field detection element, the first magnet and the second magnet being fixed to the other one of the movable member and the support member. The program causes the computer to execute a position detection step of reading out a second set of linear functions from a storage unit that stores a relationship between the movement amount of the movable member in the first direction and magnetic field information detected by the first magnetic field detection element, as a first set of linear functions corresponding to each division region in a case where a detection range of the magnetic field information detected by the first magnetic field detection element is divided into a plurality of division regions, stores the first set in association with each of a plurality of positions of the movable member in the second direction, and stores a relationship between the movement amount of the movable member in the second direction and magnetic field information detected by the second magnetic field detection element, as the second set of the linear functions corresponding to each division region in a case where a detection range of the magnetic field information detected by the second magnetic field detection element is divided into a plurality of division regions, detecting a position of the movable member in the second direction by using the magnetic field information detected by the second magnetic field detection element and the linear functions of the second set corresponding to the division region to which the magnetic field information belongs, and detecting a position of the movable member in the first direction based on the position of the movable member in the second direction, the first set read out from the storage unit, and the magnetic field information detected by the first magnetic field detection element.

According to the present invention, it is possible to provide an image shake correction device capable of improving position detection accuracy of a movable member, an imaging device including the same, a position detection method, and a computer readable medium storing a position detection program.

BRIEF DESCRIPTION OF THE DRAWINGS

FIG. 12 is a diagram showing an example of a data set corresponding to a Y-axis rotation position detection Hall element H2 stored in the ROM of the memory 109 shown in FIG. 1.

FIG. 13 is a diagram showing an example of a data set corresponding to a Y-axis rotation position detection Hall element H3 stored in the ROM of the memory 109 shown in FIG. 1.

DESCRIPTION OF THE PREFERRED EMBODIMENTS

Hereinafter, embodiments of the present invention will be described with reference to the drawings.

Figure 1:
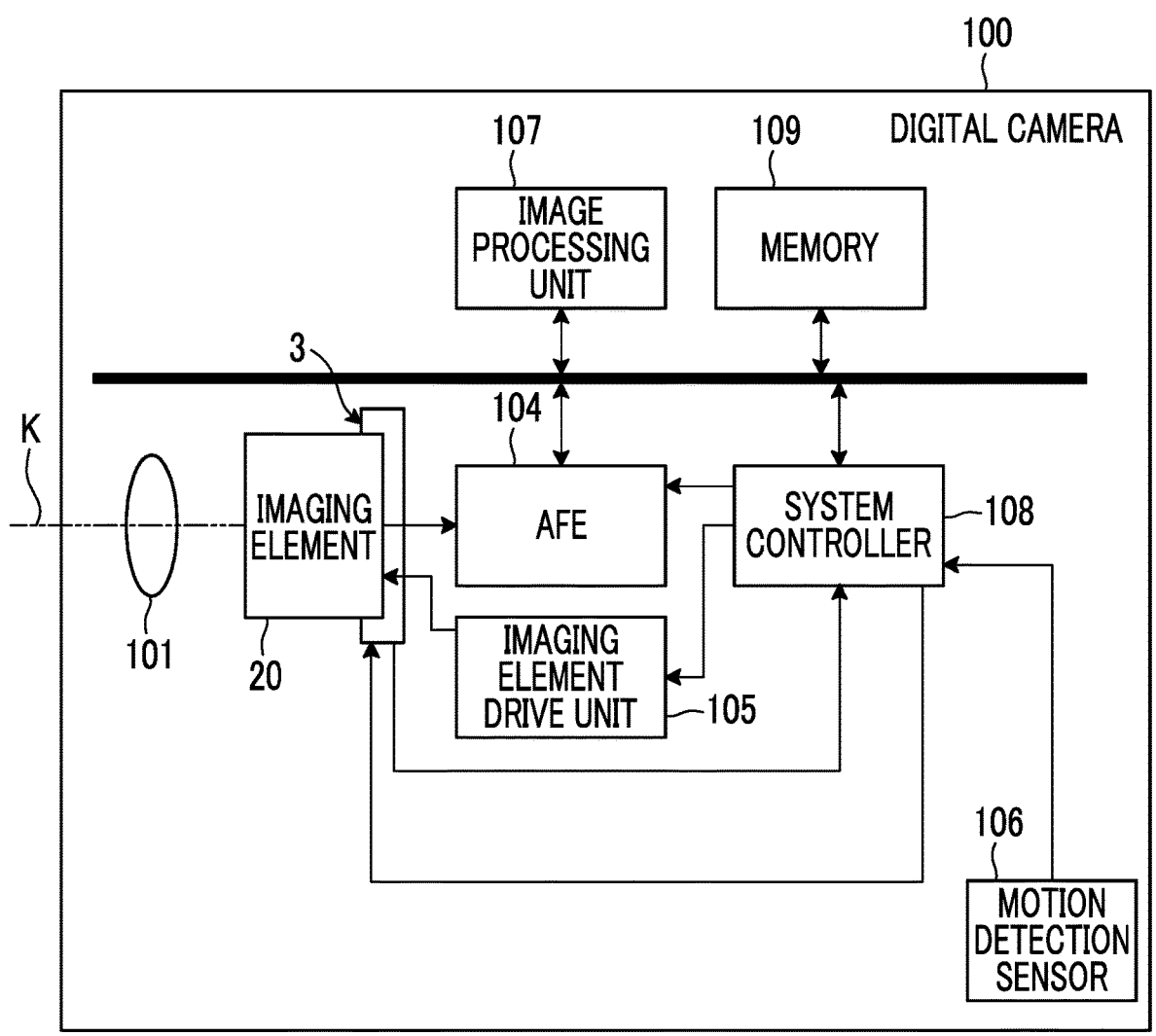
FIG. 1 is a diagram showing a schematic configuration of a digital camera 100 which is an embodiment of an imaging device of the present invention.

FIG. 1 is a diagram showing a schematic configuration of a digital camera 100 which is an embodiment of an imaging device of the present invention.

The digital camera 100 comprises an imaging lens 101, an imaging element 20, an image shake correction mechanism 3, an imaging element drive unit 105 that drives the imaging element 20, an analog front end (AFE) 104, an image processing unit 107, a motion detection sensor 106, a system controller 108 that performs overall control of the entire digital camera 100, and a memory 109.

The imaging lens 101 includes a focus lens or a zoom lens.

The imaging element 20 images a subject through the imaging lens 101, and comprises a semiconductor chip on which a charge coupled device (CCD) image sensor or a complementary metal oxide semiconductor (CMOS) image sensor is formed and a package that accommodates the semiconductor chip.

Figure 3:
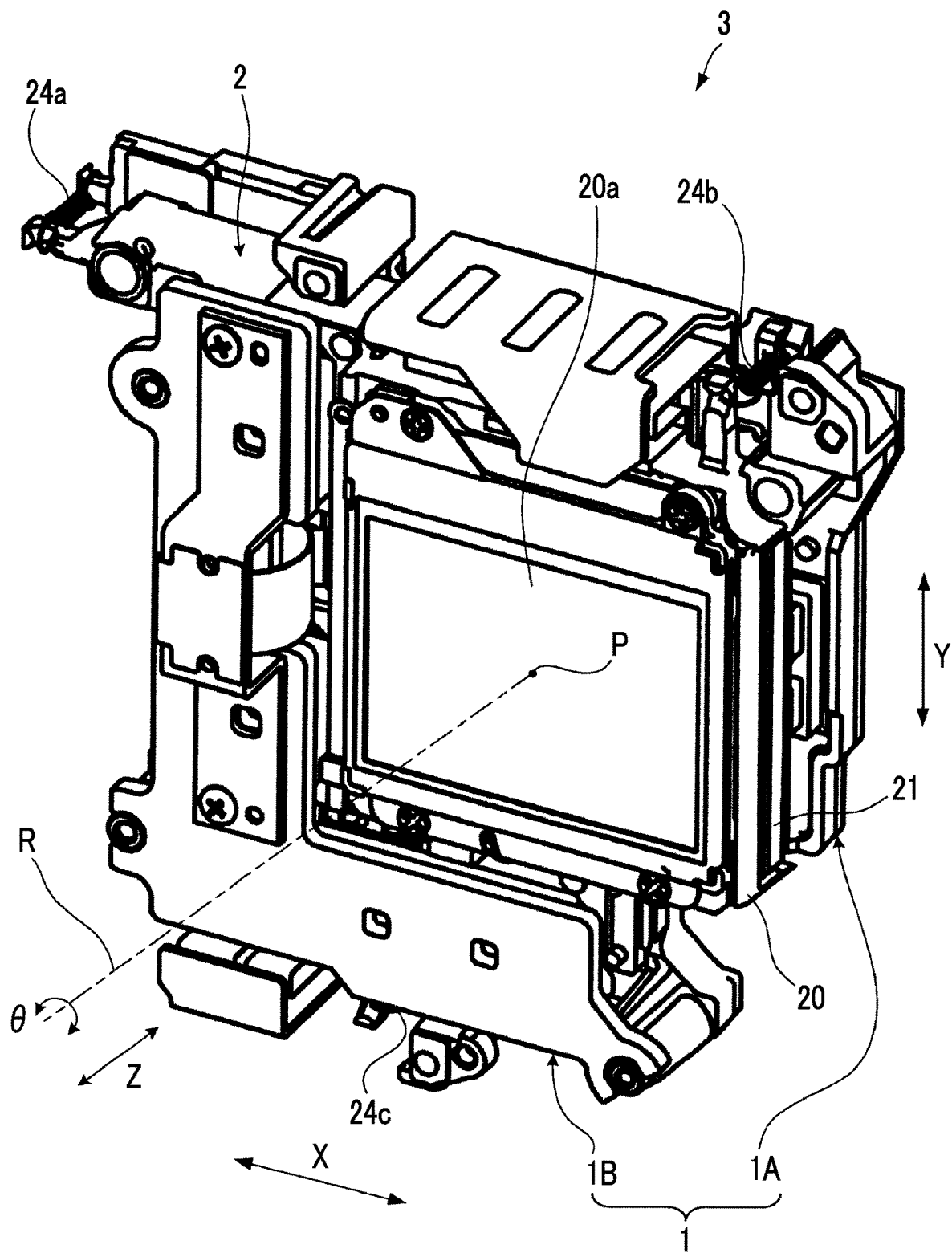
FIG. 3 is a perspective view showing an appearance configuration of the image shake correction mechanism 3 shown in FIGS. 1 and 2.

As shown in FIG. 3 to be described below, a light receiving surface 20a of the imaging element 20 has a rectangular shape.

The image shake correction mechanism 3 corrects image shake of a captured image captured by the imaging element 20 by moving the light receiving surface 20a of the imaging element 20 within a surface perpendicular to an optical axis K of the imaging lens 101.

In the present specification, in the digital camera 100, a state in which the light receiving surface 20a of the imaging element 20 is perpendicular to a gravity direction (a state in which the optical axis K is parallel to the gravity direction), and a state in which the image shake correction mechanism 3 is not energized are referred to as a reference state. In this reference state, a center P (see FIG. 3) of the light receiving surface 20a is located on the optical axis K.

Although the detailed configuration of the image shake correction mechanism 3 will be described below, the image shake is corrected by moving the imaging element 20 in three directions of a first direction which is a lateral direction (direction Y shown in FIG. 3) of the light receiving surface 20a of the imaging element 20 in the reference state, a second direction which is a longitudinal direction (direction X shown in FIG. 3) of the light receiving surface 20a of the imaging element 20 in the reference state, and a third direction which is a direction (direction θ shown in FIG. 3) along a circumference of a circle using the center P of the light receiving surface 20a of the imaging element 20 as a center.

The AFE 104 includes a signal processing circuit that performs correlative double sampling processing and digital conversion processing on imaging signals output from the imaging element 20.

The image processing unit 107 performs digital signal processing on the imaging signals processed by the AFE 104, and generates captured image data such as a Joint Photographic Experts Group (JPEG) format.

The motion detection sensor 106 is a sensor that detects the movement of the digital camera 100, and includes an acceleration sensor, an angular velocity sensor, or both thereof.

The system controller 108 controls the imaging element drive unit 105 and the AFE 104 such that the subject is captured by the imaging element 20 and the imaging signal corresponding to a subject image is output from the imaging element 20.

The system controller 108 controls the image shake correction mechanism 3 based on movement information of the digital camera 100 detected by the motion detection sensor 106. The system controller 108 corrects the image shake of the captured image captured by the imaging element 20 by moving the light receiving surface 20a of the imaging element 20 in at least one of the direction X, the direction Y, or the direction θ.

In a state in which the image shake correction mechanism 3 is energized, in a case where the movement of the digital camera 100 is not detected by the motion detection sensor 106, the system controller 108 controls the image shake correction mechanism 3 such that a position of the light receiving surface 20a of the imaging element 20 is a position in the reference state.

The system controller 108 performs overall control of the entire digital camera 100, and includes various processors that perform processing by executing a program including a position detection program.

As the various processors, a central processing unit (CPU) which is a general-purpose processor that executes various processing by executing programs, a programmable logic device (PLD) which is a processor capable of changing a circuit configuration after a field programmable gate array (FPGA) is manufactured, or a dedicated electrical circuit which is a processor having a circuit configuration specially designed to execute specific processing such as an application specific integrated circuit (ASIC).

More specifically, structures of these various processors are electric circuits in which circuit elements such as semiconductor elements are combined.

The system controller 108 may be constituted by one of various processors, or may be constituted by a combination of two or more processors of the same type or different types (for example, a combination of a plurality of FPGAs or a combination of a CPU and an FPGA).

The memory 109 includes a random access memory (RAM) and a read only memory (ROM). The ROM stores programs and various pieces of data necessary for an operation of the system controller 108.

The image shake correction mechanism 3, the system controller 108, and the memory 109 constitute an image shake correction device. The ROM of the memory 109 forms a storage unit.

Figure 2:
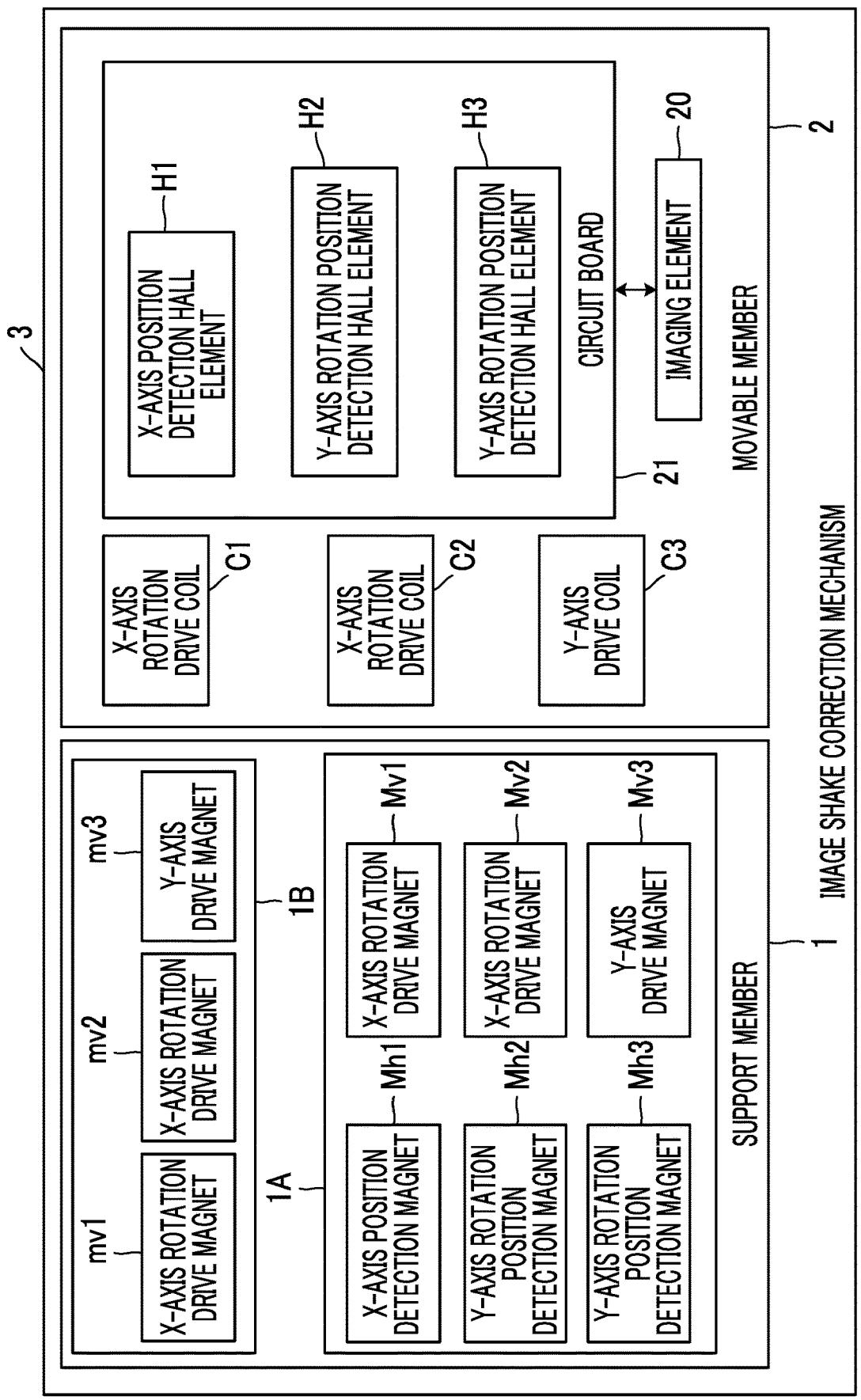
FIG. 2 is a diagram showing a schematic configuration of an image shake correction mechanism 3 in the digital camera 100 shown in FIG. 1.

FIG. 2 is a diagram showing a schematic configuration of the image shake correction mechanism 3 in the digital camera 100 shown in FIG. 1.

The image shake correction mechanism 3 comprises a movable member 2 movable in each of the directions X, Y, and θ, and a support member 1 that supports the movable member 2 to be movable in each of the directions X, Y, and θ.

A circuit board 21 on which the imaging element 20 is fixed (mounted), an X-axis rotation drive coil C1, an X-axis rotation drive coil C2, and a Y-axis drive coil C3 are fixed to the movable member 2.

An X-axis position detection Hall element H1 that is a position detection element for detecting a position of the movable member 2 in the direction X, and a Y-axis rotation position detection Hall element H2 and a Y-axis rotation position detection Hall element H3 which are position detection elements for detecting positions of the movable member 2 in the direction Y and the direction θ are fixed to the circuit board 21.

Output signals of the X-axis position detection Hall element H1, the Y-axis rotation position detection Hall element H2, and the Y-axis rotation position detection Hall element H3 are input to the system controller 108.

The system controller 108 detects a position of the movable member 2 based on the output signals, moves the movable member 2 by controlling a control current flowing through the X-axis rotation drive coil C1, a control current flowing through the X-axis rotation drive coil C2, and a control current flowing through the Y-axis drive coil C3 such that the detected position matches a target position, and corrects the image shake.

The support member 1 includes a first support member 1A and a second support member 1B.

An X-axis rotation drive magnet Mv1, an X-axis rotation drive magnet Mv2, a Y-axis drive magnet Mv3, an X-axis position detection magnet Mh1, a Y-axis rotation position detection magnet Mh2, and a Y-axis rotation position detection magnet Mh3 are fixed to the first support member 1A.

The X-axis rotation drive magnet mv1, the X-axis rotation drive magnet mv2, and the Y-axis drive magnet mv3 are fixed to the second support member 1B.

Hereinafter, the X-axis rotation drive magnets Mv1 and mv1, the X-axis rotation drive magnets Mv2 and mv2, and the Y-axis drive magnets Mv3 and mv3 are simply referred to as the drive magnets. The X-axis position detection magnet Mh1, the Y-axis rotation position detection magnet Mh2, and the Y-axis rotation position detection magnet Mh3 may be simply referred to as the position detection magnets.

FIG. 3 is a perspective view showing an appearance configuration of the image shake correction mechanism 3 shown in FIGS. 1 and 2. FIG. 3 shows an appearance of the image shake correction mechanism 3 in the reference state.

As shown in FIG. 3, the image shake correction mechanism 3 comprises the support member 1 constituted by the first support member 1A and the second support member 1B and the movable member 2 to which the circuit board 21 on which the imaging element 20 is mounted is fixed. The movable member 2 is biased against the first support member 1A by springs 24a, 24b, and 24c which are elastic members.

This image shake correction mechanism 3 is fixed to the main body of the digital camera 100 in a state in which the light receiving surface 20a faces the imaging lens 101 shown in FIG. 1.

The image shake correction mechanism 3 corrects the image shake by moving the movable member 2 in the direction θ using, as a center, a rotation axis R (an axis which is parallel to the gravity direction and passes through the center P in the reference state) which is perpendicular to the light receiving surface 20a and passes through the center P of the light receiving surface 20a, the direction X which is the longitudinal direction of the light receiving surface 20a, and the direction Y which is the lateral direction of the light receiving surface 20a.

Hereinafter, a direction in which the rotation axis R extends is referred to as a direction Z. A flat surface perpendicular to the rotation axis R is a flat surface on which the movable member 2 moves.

The movable member 2 is movable in one direction (left direction) of the direction X and the other direction (right direction) of the direction X from the reference state by the same distance.

The movable member 2 is movable in one direction (up direction) of the direction Y and the other direction (down direction) of the direction Y from the reference state by the same distance.

The movable member 2 is rotatable in one direction (right rotation direction) of the direction θ and the other direction (left rotation direction) of the direction θ by the same angle.

Figure 4:
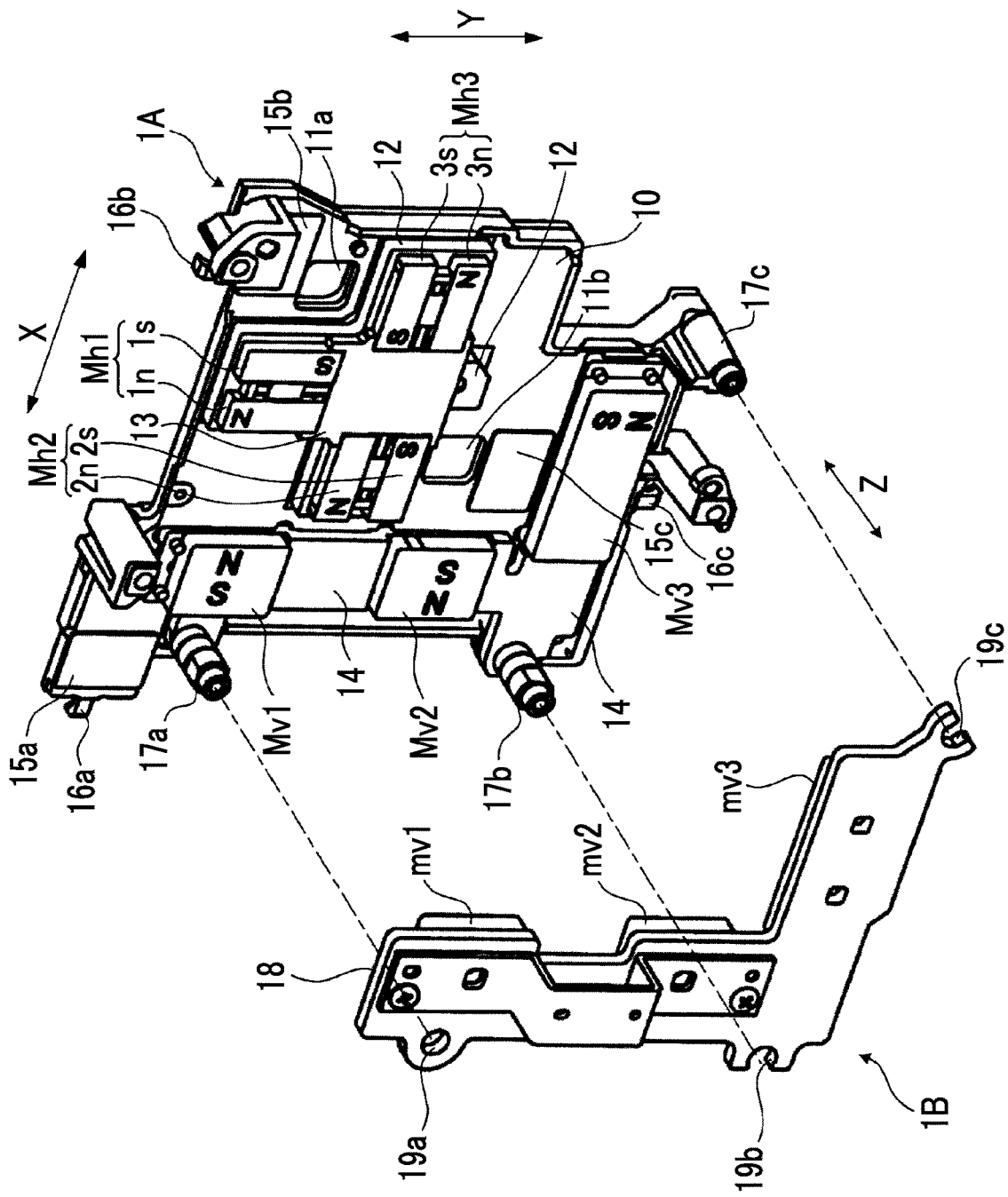
FIG. 4 is an exploded perspective view of a support member 1 in the image shake correction mechanism 3 shown in FIG. 3 is viewed from an imaging lens 101 side.

FIG. 4 is an exploded perspective view of the support member 1 in the image shake correction mechanism 3 shown in FIG. 3 as viewed from the imaging lens 101 side.

Figure 5:
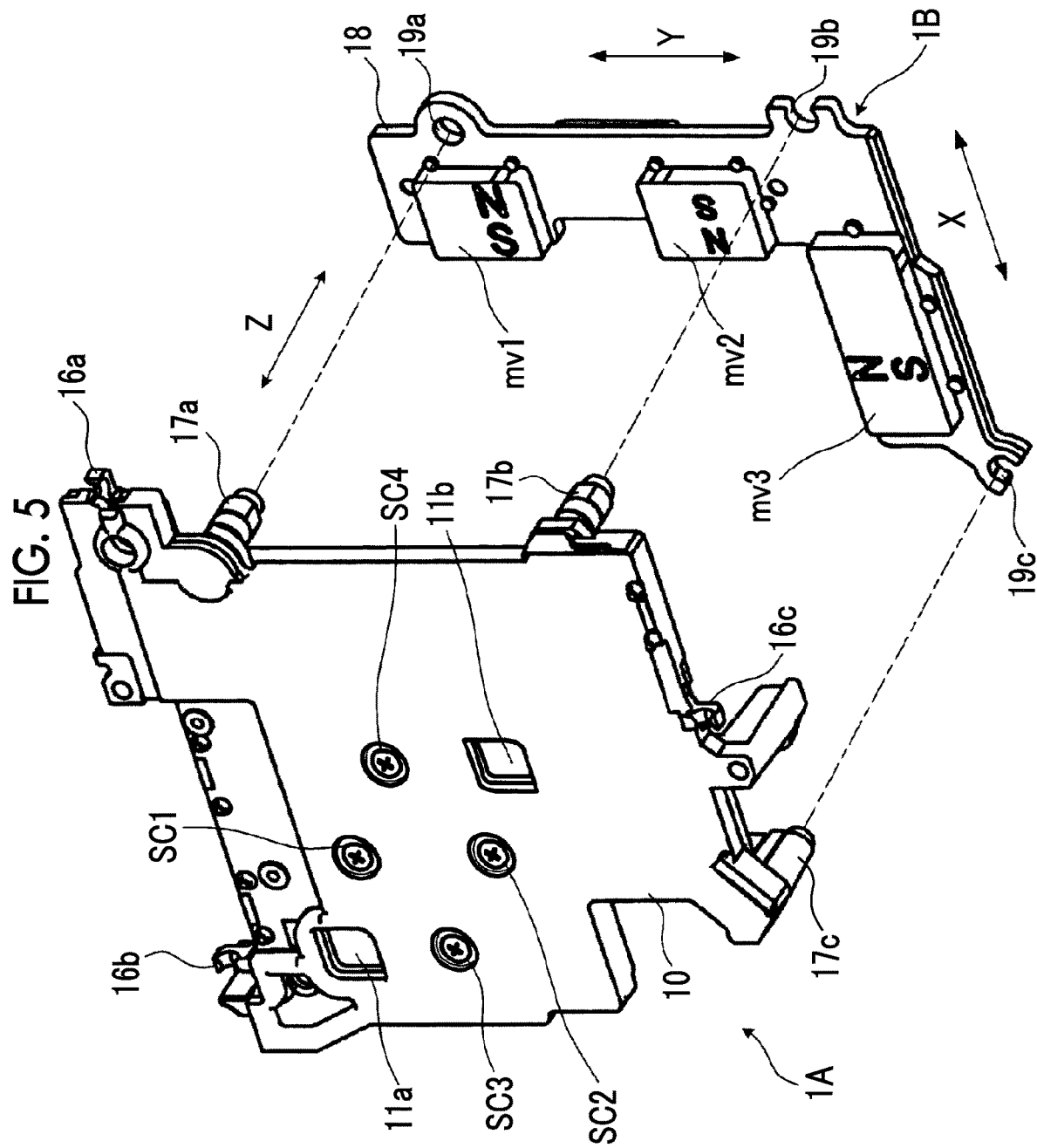
FIG. 5 is an exploded perspective view of the support member 1 shown in FIG. 4 is viewed from a side opposite to the imaging lens 101 side.

FIG. 5 is an exploded perspective view of the support member 1 shown in FIG. 4 as viewed from a side opposite to the imaging lens 101 side.

As shown in FIGS. 4 and 5, the first support member 1A comprises a plate-like base 10 that is made of resin and has a flat surface perpendicular to the direction Z, and projecting portions 17a, 17b, and 17c extending in the direction Z from an edge part of the base 10 to the imaging lens 101 side.

The second support member 1B has a substantially L-shaped yoke 18 as viewed from the imaging lens 101 side.

A hole portion 19*a* and notch portions 19*b* and 19*c* at positions facing the projecting portions 17*a*, 17*b* and 17*c* are formed at the yoke 18.

In a state in which the movable member 2 is disposed between the first support member 1A and the second support member 1B, the projecting portion 17*a* of the first support member 1A is fixed by being fitted into the hole portion 19*a* of the second support member 1B, the projecting portion 17*b* of the first support member 1A is fixed by being fitted into the notch portion 19*b* of the second support member 1B, and the projecting portion 17*c* of the first support member 1A is fixed by being fitted into the notch portion 19*c* of the second support member 1B. Accordingly, the movable member 2 is supported by the support member 1.

As shown in FIG. 4, substantially L-shaped yokes 14 as viewed from the imaging lens 101 side are formed at a left end portion in the direction X and a lower end portion in the direction Y as viewed from the imaging lens 101 side on a surface of the base 10 on the imaging lens 101 side.

The X-axis rotation drive magnet Mv1 constituting the drive magnet and the X-axis rotation drive magnet Mv2 constituting the drive magnet are arranged and fixed on a front surface of portions of the yokes 14 of the first support member 1A that extends along the direction Y with a space in the direction Y.

As viewed from the imaging lens 101 side, the X-axis rotation drive magnet Mv1 is disposed such that an N-pole faces the right direction of the direction X and an S-pole faces the left direction of the direction X.

As viewed from the imaging lens 101 side, the X-axis rotation drive magnet Mv2 is disposed such that an N-pole faces the left direction of the direction X and an S-pole faces the right direction of the direction X.

The Y-axis drive magnet Mv3 constituting the drive magnet is fixed on a front surface of a portion of the yoke 14 of the first support member 1A that extends along the direction X.

As viewed from the imaging lens 101 side, the Y-axis drive magnet Mv3 is disposed such that an N-pole faces the down direction of the direction Y and an S-pole faces the up direction of the direction Y.

Figure 7:
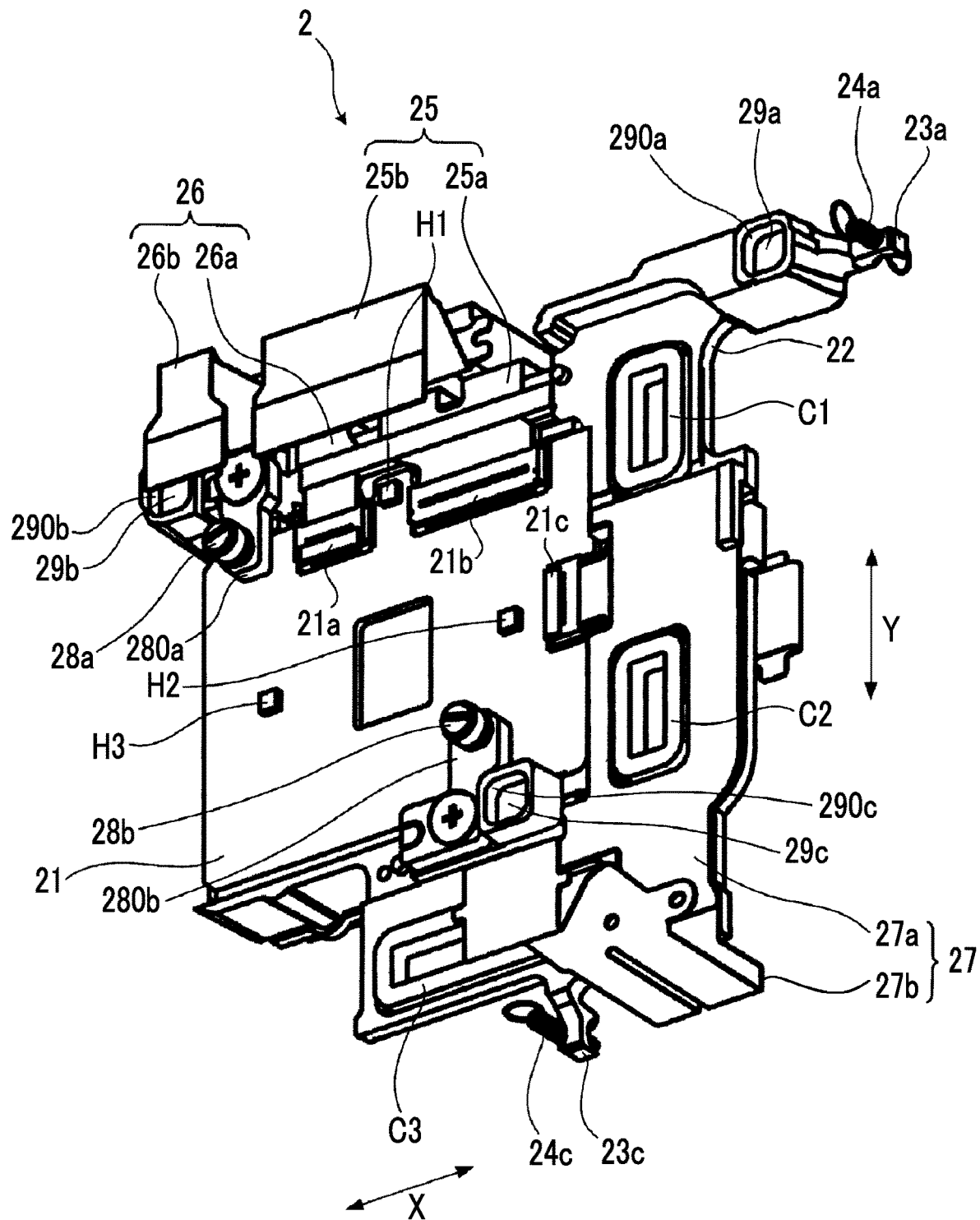
FIG. 7 is a perspective view of the movable member 2 shown in FIG. 6 as viewed from the side opposite to the imaging lens 101 side.

As shown in FIG. 5, the X-axis rotation drive magnet mv1 constituting the drive magnet is fixed on a front surface of the yoke 18 of the second support member 1B on the first support member 1A side at a position facing the X-axis rotation drive magnet Mv1 of the first support member 1A with the X-axis rotation drive coil C1 of the movable member 2 described in FIG. 7 interposed therebetween.

An S-pole of the X-axis rotation drive magnet mv1 faces the N-pole of the X-axis rotation drive magnet Mv1 with the X-axis rotation drive coil C1 interposed therebetween. An N-pole of the X-axis rotation drive magnet mv1 faces the S-pole of the X-axis rotation drive magnet Mv1 with the X-axis rotation drive coil C1 interposed therebetween.

Figure 6:
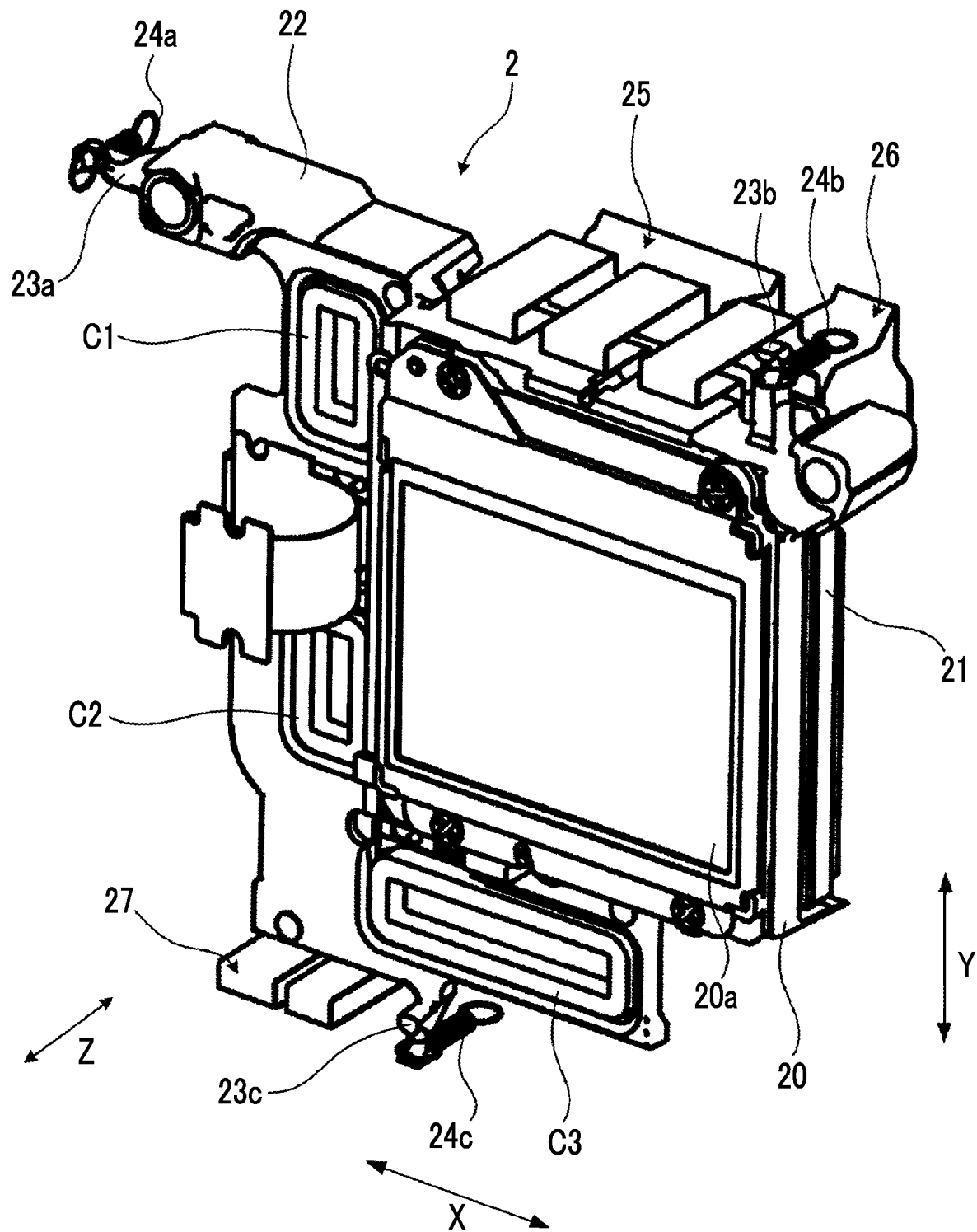
FIG. 6 is a perspective view of a movable member 2 in the image shake correction mechanism 3 shown in FIG. 3 as viewed from the imaging lens 101 side.
Figure 8:
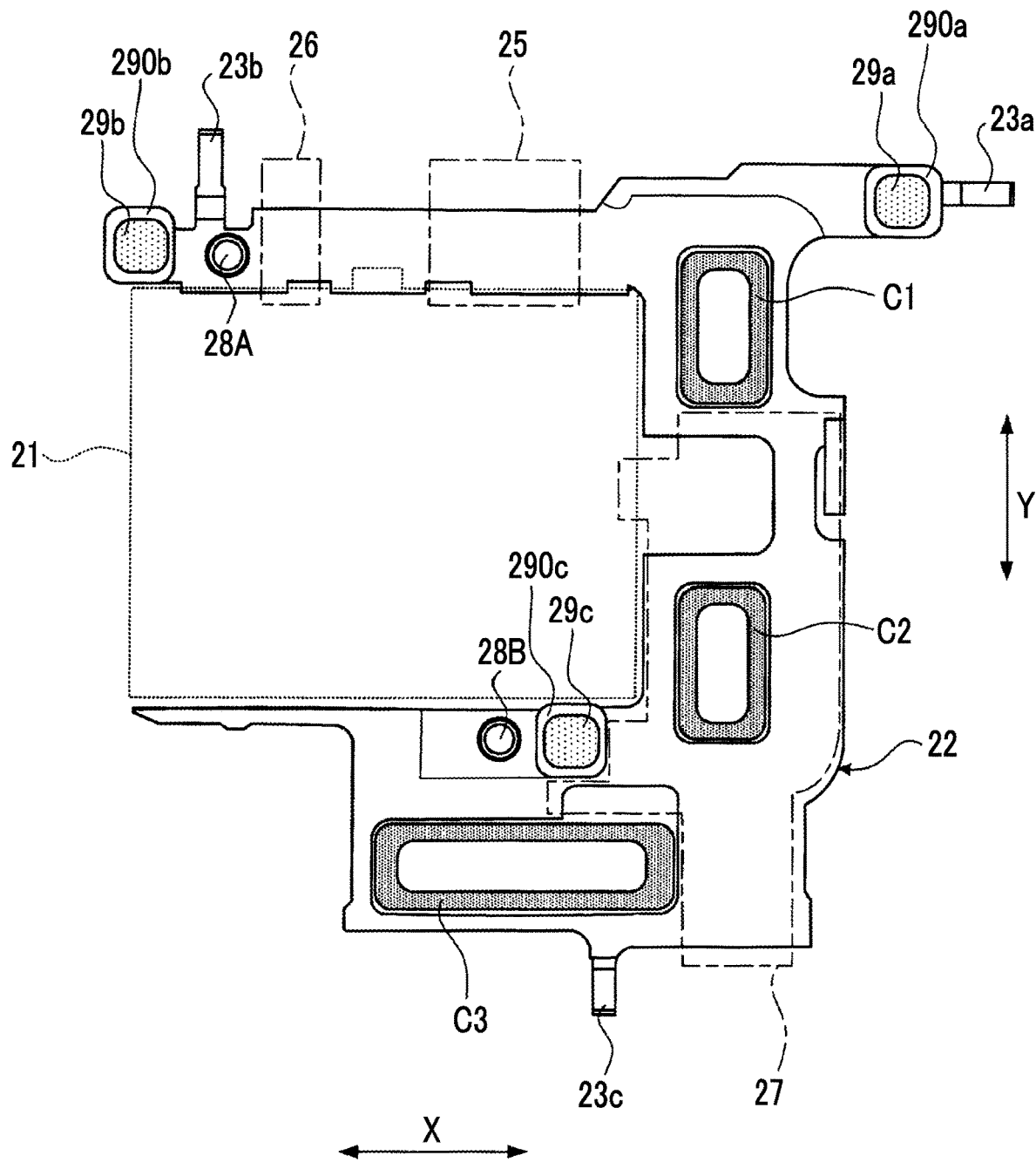
FIG. 8 is a plan view of the movable member 2 shown in FIG. 6 as viewed from the side opposite to the imaging lens 101 side.

As shown in FIG. 5, the X-axis rotation drive magnet mv2 constituting the drive magnet is fixed on a front surface of the yoke 18 of the second support member 1B on the first support member 1A side at a position facing the X-axis rotation drive magnet Mv2 of the first support member 1A with the X-axis rotation drive coil C2 of the movable member 2 described in FIGS. 6 to 8 interposed therebetween.

An S-pole of the X-axis rotation drive magnet mv2 faces the N-pole of the X-axis rotation drive magnet Mv2 with the X-axis rotation drive coil C2 interposed therebetween. An N-pole of the X-axis rotation drive magnet mv2 faces the S-pole of the X-axis rotation drive magnet Mv2 with the X-axis rotation drive coil C2 interposed therebetween.

As shown in FIG. 5, the Y-axis drive magnet mv3 constituting the drive magnet is fixed on a front surface of the yoke 18 of the second support member 1B on the first support member 1A side at a position facing the Y-axis drive magnet Mv3 with the Y-axis drive coil C3 of the movable member 2 described in FIGS. 6 to 8 interposed therebetween.

An S-pole of the Y-axis drive magnet mv3 faces the N-pole of the Y-axis drive magnet Mv3 with the Y-axis drive coil C3 interposed therebetween. An N-pole of the Y-axis drive magnet mv3 faces the S-pole of the Y-axis drive magnet Mv3 with the Y-axis drive coil C3 interposed therebetween.

As shown in FIG. 4, substantially plus-shaped yokes 12 as viewed in the direction Z are formed at a portion facing the circuit board 21 fixed to the movable member 2 described in FIGS. 6 and 8 on a surface of the imaging lens 101 side of the base 10 of the first support member 1A.

The X-axis position detection magnet Mh1 constituting a second magnet is fixed on a front surface of the yoke 12 at a position facing the X-axis position detection Hall element H1 (see FIG. 7 to be described below) fixed to the circuit board 21 fixed to the movable member 2.

The X-axis position detection magnet Mh1 has an S-pole 1*s* and an N-pole 1*n* which are arranged with a space in the direction X, and the X-axis position detection Hall element H1 is disposed to face an intermediate position between the S-pole is and the N-pole 1*n*.

The N-pole 1*n* of the X-axis position detection magnet Mh1 is disposed on the left side in the direction X as viewed from the imaging lens 101 side with respect to the S-pole 1*s* of the X-axis position detection magnet Mh1.

The Y-axis rotation position detection magnet Mh2 constituting a first magnet is fixed on the front surface of the yoke 12 at a position facing the Y-axis rotation position detection Hall element H2 (see FIG. 7 to be described below) fixed to the circuit board 21 fixed to the movable member 2.

The Y-axis rotation position detection magnet Mh2 has an S-pole 2*s* and an N-pole 2*n* arranged with a space in the direction Y, and the Y-axis rotation position detection Hall element H2 is disposed to face an intermediate position between the S-pole 2*s* and the N-pole 2*n*.

The N-pole 2*n* of the Y-axis rotation position detection magnet Mh2 is disposed on the upper side of the direction Y as viewed from the imaging lens 101 side with respect to the S-pole 2*s* of the Y-axis rotation position detection magnet Mh2.

The Y-axis rotation position detection magnet Mh3 constituting a first magnet is fixed on the front surface of the yoke 12 at a position facing the Y-axis rotation position detection Hall element H3 (see FIG. 7 to be described below) fixed to the circuit board 21 fixed to the movable member 2.

The Y-axis rotation position detection magnet Mh3 has an S-pole 3*s* and an N-pole 3*n* arranged with a space in the direction Y, and the Y-axis rotation position detection Hall element H3 is disposed to face an intermediate position between the S-pole 3*s* and the N-pole 3*n*.

The N-pole 3*n* of the Y-axis rotation position detection magnet Mh3 is disposed on the lower side of the direction Y as viewed from the imaging lens 101 side with respect to the S-pole 3*s* of the Y-axis rotation position detection magnet Mh3.

In the example shown in FIG. 4, the X-axis position detection magnet Mh1, the Y-axis rotation position detection magnet Mh2, and the Y-axis rotation position detection magnet Mh3 are coupled and integrated by a coupling member 13. Since the coupling member 13 is fixed to the yoke 12, the X-axis position detection magnet Mh1, the Y-axis rotation position detection magnet Mh2, and the Y-axis rotation position detection magnet Mh3 are fixed to the first support member 1A.

As shown in FIG. 5, the yoke 12 is fixed to the base 10 by screws SC1 to SC4 inserted from screw holes formed on a surface opposite to the imaging lens 101 side of the base 10 of the first support member 1A.

As shown in FIG. 4, three flat surfaces 15a, 15b, and 15c perpendicular to the direction Z are formed on the surface of the imaging lens 101 side of the base 10. The positions of the flat surfaces 15a, 15b, and 15c in the direction Z are all the same, and these flat surfaces are all formed on the same flat surface.

On the surface on the imaging lens 101 side of the base 10, a through-hole 11a for restricting the movement of the movable member 2 is formed on an upper side in the direction Y from the Y-axis rotation position detection magnet Mh3, and a through-hole 11b for restricting the movement of the movable member 2 is formed on a lower side in the direction Y from the Y-axis rotation position detection magnet Mh2, as viewed from the imaging lens 101 side.

A hook 16a extending in the direction X in which one end of the spring 24a shown in FIG. 3 is locked, a hook 16b extending in the up direction of the direction Y in which one end of the spring 24b shown in FIG. 3 is locked, and a hook 16c extending in the down direction of the direction Y in which one end of the spring 24c shown in FIG. 3 is locked are formed at a peripheral portion of the base 10.

FIG. 6 is a perspective view of the movable member 2 in the image shake correction mechanism 3 shown in FIG. 3 as viewed from the imaging lens 101 side.

FIG. 7 is a perspective view of the movable member 2 shown in FIG. 6 as viewed from the side opposite to the imaging lens 101 side.

FIG. 8 is a plan view of the movable member 2 shown in FIG. 6 as viewed from the side opposite to the imaging lens 101 side. In FIG. 8, in order to facilitate understanding of the configuration of the movable member 2, the circuit board 21 fixed to the movable member 2 is indicated by a broken line, and flexible print substrates 25, 26, and 27 connected to the circuit board 21 are indicated by imaginary lines.

As shown in FIG. 8, the movable member 2 comprises a substantially C-shaped base 22 constituted a straight-line-shaped portion extending in the direction X, a straight-line-shaped portion extending in the direction Y from a right end portion of this portion in the direction X, and a straight-line-shaped portion extending to the left side in the direction X from a lower end portion of a portion extending in the direction Y as viewed from the imaging lens 101 side.

As shown in FIGS. 6 and 7, the circuit board 21 on which the imaging element 20 is mounted is fixed to the base 22 with an adhesive at a portion facing a region surrounded by the three portions.

As shown in FIGS. 6 to 8, the X-axis rotation drive coil C1 is formed at the base 22 at a position facing each of the X-axis rotation drive magnets Mv1 and mv1 shown in FIG. 4.

The X-axis rotation drive coil C2 is formed at the base 22 at a position facing each of the X-axis rotation drive magnets Mv2 and mv2 shown in FIG. 4.

The Y-axis drive coil C3 is formed at the base 22 at a position facing each of the Y-axis drive magnets Mv3 and mv3 shown in FIG. 4.

The X-axis rotation drive coil C1 shown in FIGS. 6 to 8 and the X-axis rotation drive magnets Mv1 and mv1 shown in FIG. 4 constitute an X-axis drive voice coil motor (VCM).

The X-axis drive VCM moves the movable member 2 in the direction X by an electromagnetic induction action between the X-axis rotation drive coil C1 and the X-axis rotation drive magnets Mv1 and mv1 by causing a control current to flow through the X-axis rotation drive coil C1.

The X-axis rotation drive coil C2 shown in FIGS. 6 to 8 and the X-axis rotation drive magnets Mv2 and mv2 shown in FIG. 4 constitute a VCM. This VCM and the X-axis drive VCM constitute a rotation drive VCM.

The rotation drive VCM rotates the movable member 2 around the rotation axis R with the center P of the light receiving surface 20a with a rotation center by an electromagnetic induction action between the X-axis rotation drive coil C1 and the X-axis rotation drive magnets Mv1 and mv1 and an electromagnetic induction action between the X-axis rotation drive coil C2 and the X-axis rotation drive magnets Mv2 and mv2 by reversing the directions of the control currents flowing through the X-axis rotation drive coil C1 and the X-axis rotation drive coil C2 shown in FIGS. 6 to 8.

The Y-axis drive coil C3 shown in FIGS. 6 to 8 and the Y-axis drive magnets Mv3 and mv3 shown in FIG. 4 constitute a Y-axis drive VCM.

The Y-axis drive VCM moves the movable member 2 in the direction Y by an electromagnetic induction action between the Y-axis drive coil C3 and the Y-axis drive magnets Mv3 and mv3 by causing the control current to flow through the Y-axis drive coil C3.

As shown in FIG. 7, the X-axis position detection Hall element H1 constituting a second magnetic field detection element is fixed at a position facing the intermediate position between the S-pole is and the N-pole 1n of the X-axis position detection magnet Mh1 on a surface of the first support member 1A side of the circuit board 21 fixed to the base 22 (hereinafter, referred to as a rear surface of the circuit board 21).

The Y-axis rotation position detection Hall element H2 constituting a first magnetic field detection element is fixed at a position facing the intermediate position between the S-pole 2s and the N-pole 2n of the Y-axis rotation position detection magnet Mh2 on the rear surface of the circuit board 21.

The Y-axis rotation position detection Hall element H3 constituting the first magnetic field detection element is fixed at a position facing the intermediate position between the S-pole 3s and the N-pole 3n of the Y-axis rotation position detection magnet Mh3 on the rear surface of the circuit board 21.

The X-axis position detection Hall element H1 outputs, as magnetic field information, a signal corresponding to a magnetic field supplied from the X-axis position detection magnet Mh1, and the system controller 108 detects a position of the movable member 2 in the direction X by an output change of this signal.

The Y-axis rotation position detection Hall element H2 outputs, as magnetic field information, a signal corresponding to a magnetic field supplied from the Y-axis rotation position detection magnet Mh2, and the system controller 108 detects a position of the movable member 2 in the direction Y by an output change of this signal.

The Y-axis rotation position detection Hall element H3 outputs, as magnetic field information, a signal corresponding to a magnetic field supplied from the Y-axis rotation position detection magnet Mh3.

The system controller 108 detects, as a position of the movable member 2 in the direction θ, a rotation angle of the movable member 2 around the rotation axis R due to the change of the output signal of the Y-axis rotation position detection Hall element H3 and the change of the output signal of the Y-axis rotation position detection Hall element H2.

Figure 9:
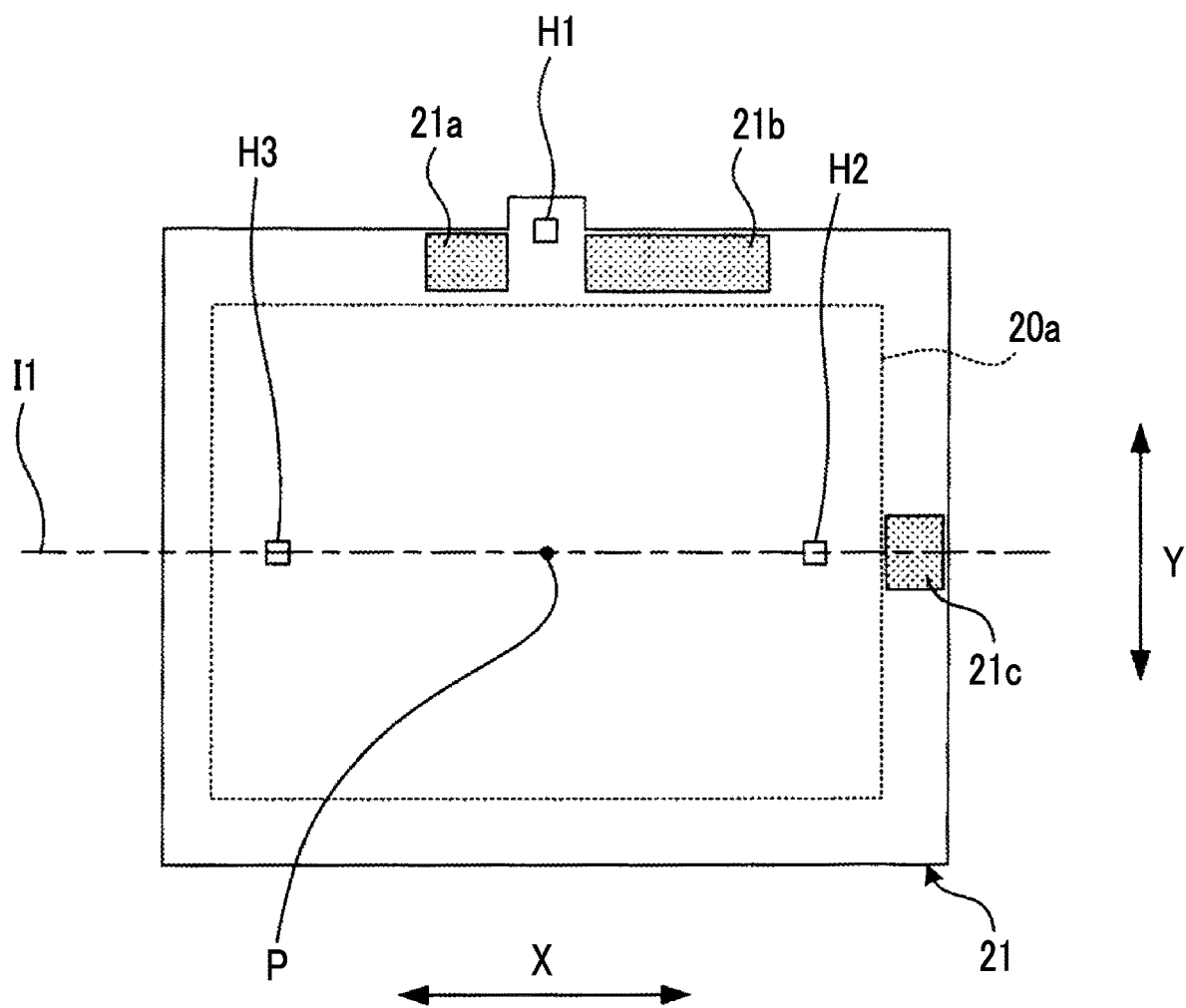
FIG. 9 is a diagram showing a state in which a rear surface of a circuit board 21 fixed to a base 22 of the movable member 2 shown in FIG. 7 is viewed in a direction Z.

FIG. 9 is a diagram showing a state in which the rear surface of the circuit board 21 fixed to the base 22 of the movable member 2 shown in FIG. 7 is viewed in the direction Z.

In FIG. 9, the center P of the light receiving surface 20a of the imaging element 20 that overlaps the rear surface of the circuit board 21 is shown. In FIG. 9, a straight line 11 which passes through the center P and is parallel to the direction X is illustrated, and the Y-axis rotation position detection Hall element H2 and the Y-axis rotation position detection Hall element H3 are arranged on the straight line 11. A distance from the Y-axis rotation position detection Hall element H2 to the center P and a distance from the Y-axis rotation position detection Hall element H3 to the center P are the same.

As shown in FIG. 4, the Y-axis rotation position detection magnet Mh2 facing the Y-axis rotation position detection Hall element H2 and the Y-axis rotation position detection magnet Mh3 facing the Y-axis rotation position detection Hall element H3 are arranged such that magnetic poles are opposite to each other in the direction Y.

In a case where the movable member 2 rotates in the right direction of the direction θ as viewed from the imaging lens 101 side, the Y-axis rotation position detection Hall element H2 and the Y-axis rotation position detection Hall element H3 move in opposite directions to each other in the direction Y by the same distance. Thus, the outputs of the Y-axis rotation position detection Hall element H2 and the Y-axis rotation position detection Hall element H3 are changed in the same manner.

The output signal of the Y-axis rotation position detection Hall element H2 output signal, the movement direction and the movement amount of the Y-axis rotation position detection Hall element H2, the output signal of the Y-axis rotation position detection Hall element H3, the movement direction and the movement amount of the Y-axis rotation position detection Hall element H3, and the rotation angle of the movable member 2 in the direction θ are associated with each other in advance, and thus, it is possible to detect the rotation position of the movable member 2 in the direction θ by the output signals of the Y-axis rotation position detection Hall element H2 and the Y-axis rotation position detection Hall element H3.

Meanwhile, in a case where the movable member 2 moves only in the direction Y, the Y-axis rotation position detection Hall element H2 and the Y-axis rotation position detection Hall element H3 move in the same direction in the direction Y by the same distance.

Thus, the output signals of the Y-axis rotation position detection Hall element H2 and the Y-axis rotation position detection Hall element H3 are changed in opposite directions.

Therefore, in a case where the outputs of the Y-axis rotation position detection Hall element H2 and the Y-axis rotation position detection Hall element H3 are changed in opposite directions, it is possible to detect the position of the movable member 2 in the direction Y by viewing the output of the Y-axis rotation position detection Hall element H2 or the Y-axis rotation position detection Hall element H3.

As shown in FIGS. 7 and 8, a recess portion 290a that accommodates a rolling element (spherical ball) for causing the movable member 2 to be movable on a surface perpendicular to the direction Z at a position facing the flat surface 15a of the first support member 1A shown in FIG. 4 is formed at the base 22. A bottom surface 29a of the recess portion 290a is a flat surface perpendicular to the direction Z.

A recess portion 290b that accommodates a rolling element for causing the movable member 2 to be movable on the surface perpendicular to the direction Z at a position facing the flat surface 15b of the first support member 1A shown in FIG. 4 is formed at the base 22. A bottom surface 29b of the recess portion 290b is a flat surface perpendicular to the direction Z.

A recess portion 290c that accommodates a rolling element for causing the movable member 2 to be movable on the surface perpendicular to the direction Z is formed at the base 22 at a position facing the flat surface 15c of the first support member 1A shown in FIG. 4. A bottom surface 29c of the recess portion 290c is a flat surface perpendicular to the direction Z.

The positions of the bottom surfaces 29a, 29b, and 29c in the direction Z are all the same, and the bottom surfaces are all formed on the same flat surface.

The movable member 2 moves on the flat surface perpendicular to the direction Z by rolling the rolling elements disposed between the bottom surface 29a of the movable member 2 and the flat surface 15a of the first support member 1A, between the bottom surface 29b of the movable member 2 and the flat surface 15b of the first support member 1A, and between the bottom surface 29c of the movable member 2 and the flat surface 15c of the first support member 1A.

As shown in FIG. 8, an attachment portion 28A is formed on the surface of the first support member 1A side of the base 22. As shown in FIG. 7, a flat plate portion 280a extending in the down direction of the direction Y at a position overlapping the circuit board 21 is fixed to the attachment portion 28A with screws. An insertion member 28a protruding in the direction Z toward the first support member 1A side is formed at the flat plate portion 280a.

As shown in FIG. 8, an attachment portion 28B is formed on the surface of the first support member 1A side of the base 22. As shown in FIG. 7, a flat plate portion 280b extending in the up direction of the direction Y at a position overlapping the circuit board 21 is fixed to the attachment portion 28B with screws. An insertion member 28b protruding in the direction Z toward the first support member 1A side is formed at the flat plate portion 280b.

The insertion member 28a is inserted into the through-hole 11a of the first support member 1A shown in FIG. 4. The insertion member 28b is inserted into the through-hole 11b of the first support member 1A shown in FIG. 4.

In a case where the movable member 2 moves on the surface perpendicular to the direction Z, the movement range of the insertion member 28a is limited to the inside of the through-hole 11a, and the movement range of the insertion member 28b is limited to the inside of the through-hole 11b. Thus, the movement range of the movable member 2 (the movement range in the direction X, the movement range in the direction Y, and the movement range in the direction θ) is restricted to a predetermined range by the pair of the insertion member 28*a* and the through-hole 11*a* and the pair of the insertion member 28*b* and the through-hole 11*b*.

Figure 10:
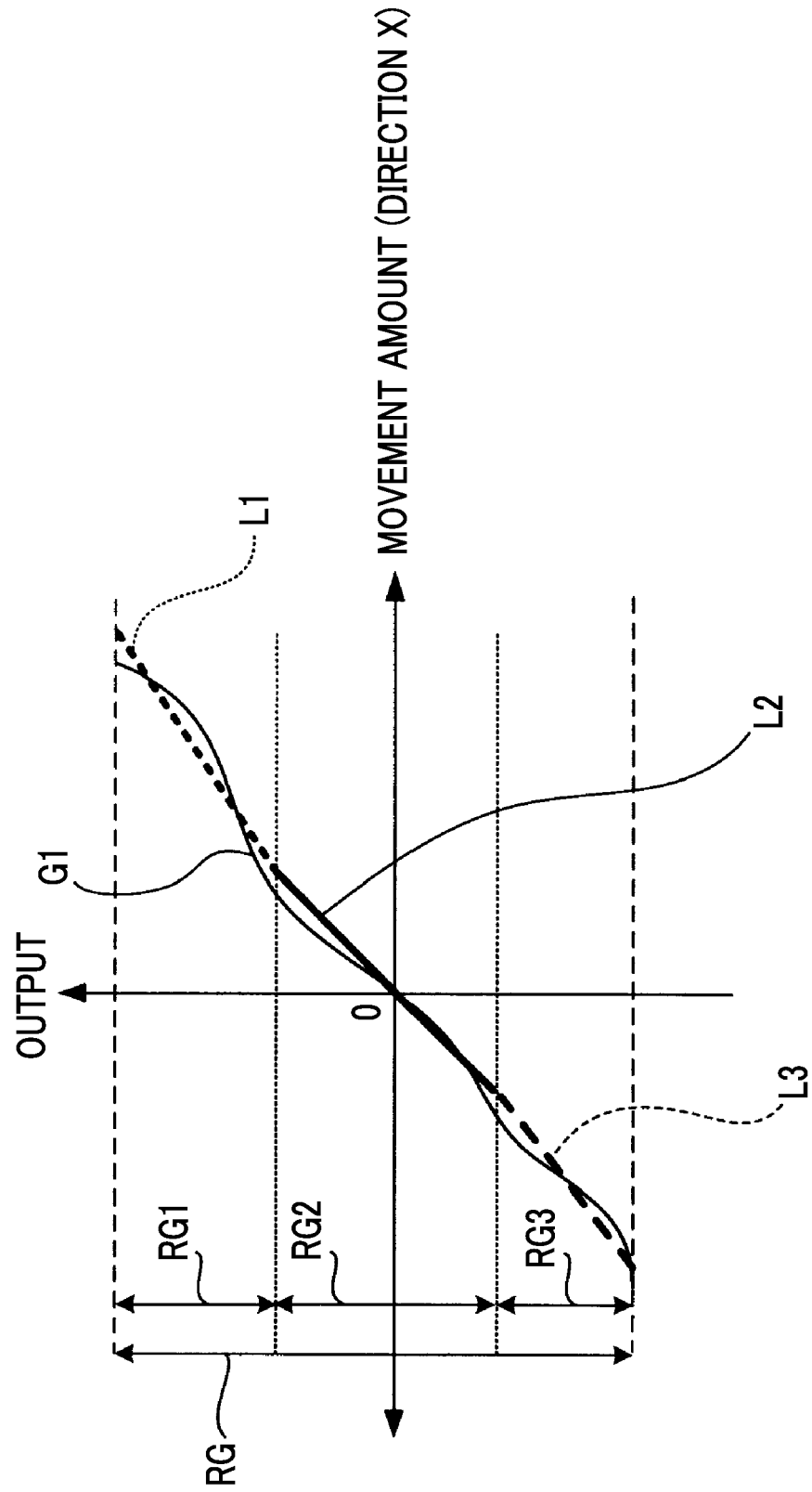
FIG. 10 is a diagram showing an example of an output signal of an X-axis position detection Hall element H1 in a case where the movable member 2 is moved from one end to the other end of a movement range in a direction X.

FIG. 10 is a diagram showing an example of an output signal of the X-axis position detection Hall element H1 in a case where the movable member 2 is moved from one end to the other end of the movement range in the direction X.

FIG. 10 shows an output characteristic curve G1 which is data indicating a relationship between the output signal of the X-axis position detection Hall element H1 and the movement amount of the movable member 2 in the direction X. The movement amount of the movable member 2 in the direction X is set to 0 in the reference state in which the optical axis K and the center P of the light receiving surface 20*a* match.

In the ROM of the memory 109 shown in FIG. 1, the output characteristic curve G1 of the X-axis position detection Hall element H1 is stored as a set of a plurality of approximate functions.

Specifically, as shown in FIG. 10, the output characteristic curve G1 is stored as a set of three linear functions of a linear approximate function indicated by a straight line L1, a linear approximate function indicated by a straight line L2, and a linear approximate function indicated by a straight line L3 in the ROM of the memory 109.

In the example of FIG. 10, a detection range RG of the magnetic field information (a range of the output signal obtained in a case where the movable member 2 is moved from one end to the other end in the direction X) by the X-axis position detection Hall element H1 is divided into three regions of a division region RG1, a division region RG2, and a division region RG3.

A portion of the output characteristic curve G1 in the division region RG1 is approximated by the linear function indicated by the straight line L1, a portion of the output characteristic curve G1 in the division region RG2 is approximated by the linear function indicated by the straight line L2, a portion of the output characteristic curve G1 in the division region RG3 is approximated by the linear function indicated by the straight line L3.

In this manner, a data set consisting of data of the linear function indicated by the straight line L1, data of the linear function indicated by the straight line L2, and data of the linear function indicated by the straight line L3 is stored in association with the X-axis position detection Hall element H1 in the ROM of the memory 109.

As shown in FIG. 4, there are many other magnets around the X-axis position detection magnet Mh1 disposed to face the X-axis position detection Hall element H1. Therefore, for example, in FIG. 4, in a state in which the movable member 2 is located at an upper end and a state in which the movable member is located at a lower end in the movement range in the direction Y, a state of the magnetic field received by the X-axis position detection Hall element H1 is changed by the influence of another magnet. Therefore, in these two states, a shape of the output characteristic curve G1 shown in FIG. 10 is also different.

Therefore, the ROM of the memory 109 does not store one data set in association with the X-axis position detection Hall element H1, but stores a plurality of data sets obtained in a state in which the movable member 2 is located at each of a plurality of positions in the direction Y.

Although the data set corresponding to the X-axis position detection Hall element H1 has been described, a data set consisting of a plurality of linear functions is similarly obtained and is stored in the ROM of the memory 109 for the Y-axis rotation position detection Hall element H2 and the Y-axis rotation position detection Hall element H3.

The ROM of the memory 109 does not store one data set in association with the Y-axis rotation position detection Hall element H2, and stores a plurality of data sets obtained in a state in which the movable member 2 is located at each of a plurality of positions in the direction X.

The ROM of the memory 109 does not store one data set in association with the Y-axis rotation position detection Hall element H3, and stores a plurality of data sets obtained in a state in which the movable member 2 is located at each of the plurality of positions in the direction X.

Figure 11:
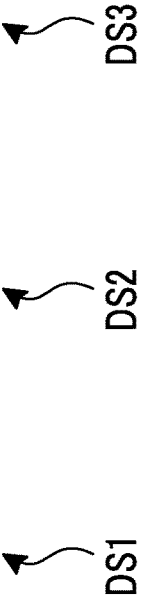
FIG. 11 is a diagram showing an example of a data set corresponding to the X-axis position detection Hall element H1 stored in a ROM of a memory 109 shown in FIG. 1.

FIG. 11 is a diagram showing an example of the data set corresponding to the X-axis position detection Hall element H1 stored in the ROM of the memory 109 shown in FIG. 1.

As shown in FIG. 11, a data set DS1 (set of functions F71, F81, and F91) obtained by approximating the output characteristic curve of the X-axis position detection Hall element H1 in a state in which the movable member 2 is located at a position y1 in the direction Y, a data set DS2 (set of functions F72, F82, and F92) obtained by approximating the output characteristic curve of the X-axis position detection Hall element H1 in a state in which the movable member 2 is located at a position y2 in the direction Y, and a data set DS3 (set of functions F73, F83, and F93) obtained by approximating the output characteristic curve of the X-axis position detection Hall element H1 in a state in which the movable member 2 is located at a position y3 in the direction Y are stored in association with each other for the X-axis position detection Hall element H1.

The position y1 indicates a position in a case where the movable member 2 is moved from the reference state to one side in the direction Y as much as possible. The position y2 indicates a position in a case where the movable member 2 is in the reference state. The position y3 indicates a position in a case where the movable member 2 is moved from the reference state to the other side in the direction Y as much as possible.

FIG. 12 is a diagram showing an example of a data set corresponding to the Y-axis rotation position detection Hall element H2 stored in the ROM of the memory 109 shown in FIG. 1.

As shown in FIG. 12, a data set DS4 (set of functions F11, F21, and F31) obtained by approximating the output characteristic curve of the Y-axis rotation position detection Hall element H2 in a state in which the movable member 2 is located at a position x1 in the direction X, a data set DS5 (set of functions F12, F22, and F32) obtained by approximating the output characteristic curve of the Y-axis rotation position detection Hall element H2 in a state in which the movable member 2 is located at a position x2 in the direction X, and a data set DS6 (set of functions F13, F23, and F33) obtained by approximating the output characteristic curve of the Y-axis rotation position detection Hall element H2 in a state in which the movable member 2 is located at a position x3 in the direction X are stored in association with each other for the Y-axis rotation position detection Hall element H2.

The position x1 indicates a position in a case where the movable member 2 is moved from the reference state to one side in the direction X as much as possible. The position x2 indicates a position in a case where the movable member 2 is in the reference state. The position x3 indicates a position in a case where the movable member 2 is moved from the reference state to the other side in the direction X as much as possible.

FIG. 13 is a diagram showing an example of the data set corresponding to the Y-axis rotation position detection Hall element H3 stored in the ROM of the memory 109 shown in FIG. 1.

As shown in FIG. 13, a data set DS7 (set of functions F41, F51, and F61) obtained by approximating the output characteristic curve of the Y-axis rotation position detection Hall element H3 in a state in which the movable member 2 is located at the position x1 in the direction X, a data set DS8 (set of functions F42, F52, and F62) obtained by approximating the output characteristic curve of the Y-axis rotation position detection Hall element H3 in a state in which the movable member 2 is located at the position x2 in the direction X, and a data set DS9 (set of functions F43, F53, and F63) obtained by approximating the output characteristic curve of the Y-axis rotation position detection Hall element H3 in a state in which the movable member 2 is located at the position x3 in the direction X are stored in association with each other for the Y-axis rotation position detection Hall element H3.

The data sets DS1 to DS3 shown in FIG. 11 constitutes a second set. The data sets DS4 to DS9 shown in FIGS. 12 and 13 constitute a first set.

The system controller 108 shown in FIG. 1 functions as a position detection unit that detects a position of the movable member 2 in the direction X, a position thereof in the direction Y, and a position thereof in the direction θ based on the output signal of the X-axis position detection Hall element H1, the output signal of the Y-axis rotation position detection Hall element H2, the output signal of the Y-axis rotation position detection Hall element H3, and the data sets shown in FIGS. 11 to 13 stored in the ROM.

Figure 14:
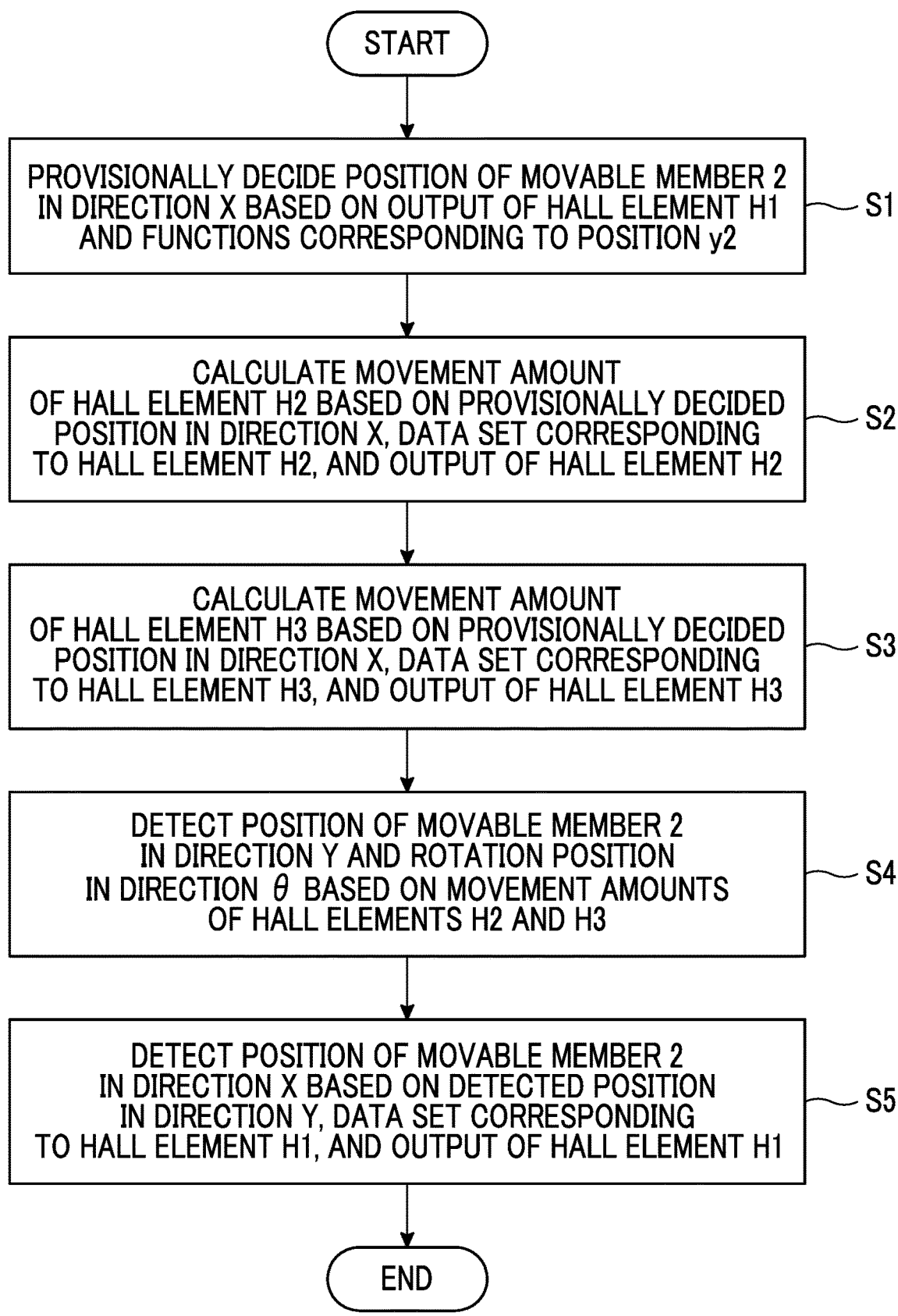
FIG. 14 is a flowchart for describing a position detection operation of the movable member 2 by a system controller 108.

FIG. 14 is a flowchart showing a position detection operation of the movable member 2 by the system controller 108.

First, the system controller 108 provisionally decides the position of the movable member 2 in the direction X based on the output signal of the X-axis position detection Hall element H1 and any one data set (the data set DS2 corresponding to the position y2 in this case) of the data sets corresponding to the X-axis position detection Hall element H1 (step S1). Any data set may be selected as the data set used in the case of the provisional decision.

Specifically, the system controller 108 acquires the output signal of the X-axis position detection Hall element H1, and specifies the division region to which the output signal belongs among the division regions RG1, RG2, and RG3. The system controller 108 reads out the function corresponding to the specified division region in the data set DS2. The system controller 108 obtains the movement amount of the movable member 2 in the direction X from the reference state from the readout function and the acquired output signal. The position of the movable member 2 in the direction X is provisionally decided based on the movement amount.

Subsequently, the system controller 108 calculates the movement amount of the Y-axis rotation position detection Hall element H2 based on the output signal of the Y-axis rotation position detection Hall element H2, the data set corresponding to the Y-axis rotation position detection Hall element H2, and the position in the direction X provisionally decided in step S1 (step S2).

Figure 15:
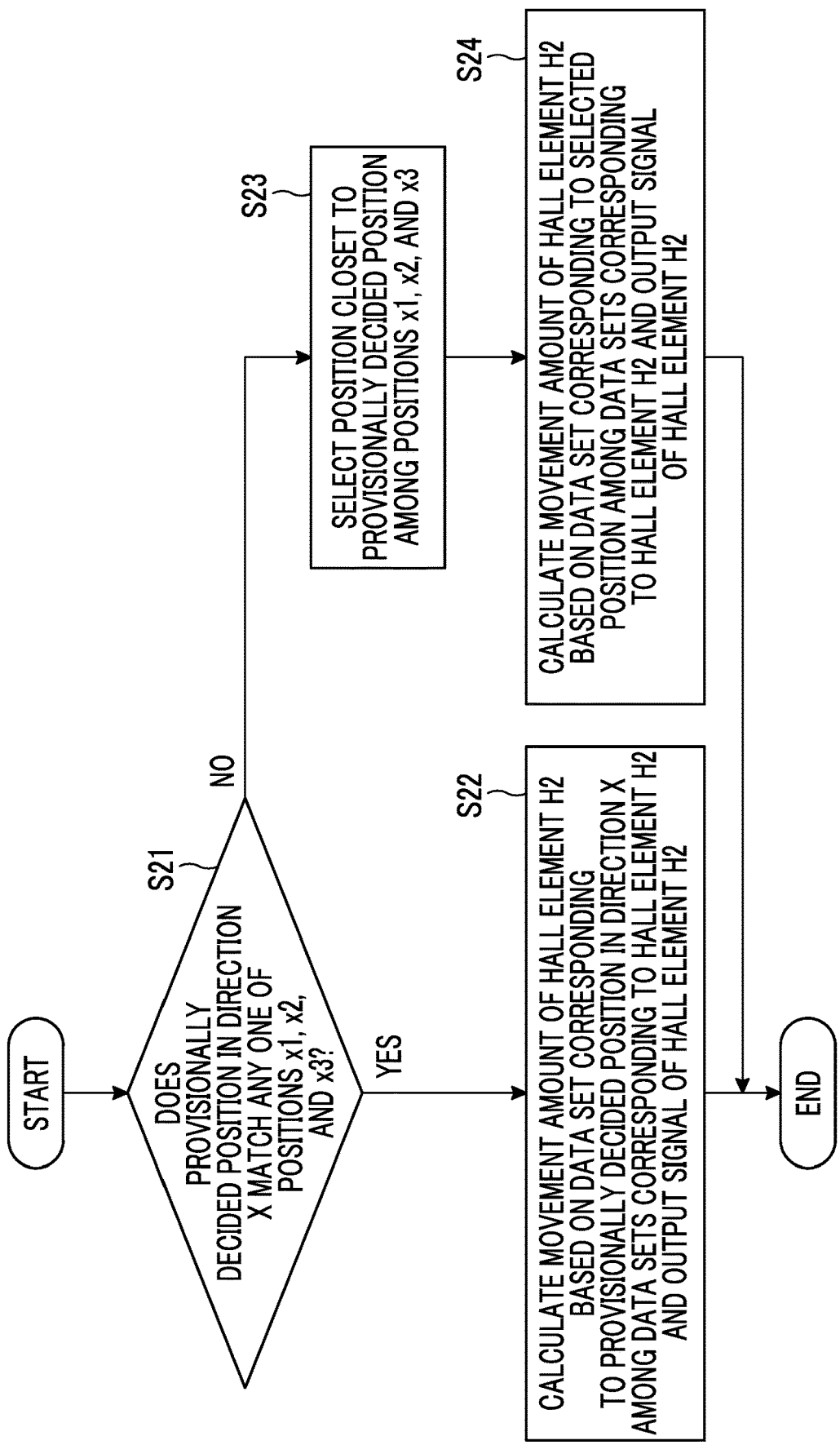
FIG. 15 is a flowchart showing details of step S2 shown in FIG. 14.

FIG. 15 is a flowchart showing details of step S2 shown in FIG. 14.

The system controller 108 determines whether or not the position in the direction X provisionally decided in step S1 matches any one of the position x1, the position x2, and the position x3 (step S21).

In a case where the determination of step S21 is YES, the system controller 108 calculates the movement amount of the Y-axis rotation position detection Hall element H2 in the direction Y based on the output signal of the Y-axis rotation position detection Hall element H2 and the data set (hereinafter, referred to as the data set DS5) corresponding to the position provisionally decided in step S1 among the data sets corresponding to the Y-axis rotation position detection Hall element H2 (step S22).

Specifically, the system controller 108 acquires the output signal of the Y-axis rotation position detection Hall element H2, and specifies the division region to which the output signal belongs among the division regions RG1, RG2, and RG3. The system controller 108 reads out the function corresponding to the specified division region in the data set DS5. The system controller 108 obtains the movement amount of the Y-axis rotation position detection Hall element H2 in the direction Y from the reference state from the readout function and the acquired output signal.

In a case where the determination of step S21 is NO, the system controller 108 selects a position closest to the position provisionally decided in step S1 among the position x1, the position x2, and the position x3 (step S23). In a case where there are two closest positions, one of the two positions may be selected.

The system controller 108 calculates the movement amount of the Y-axis rotation position detection Hall element H2 in the direction Y based on the output signal of the Y-axis rotation position detection Hall element H2 and the data set corresponding to the position selected in step S23 among the data sets corresponding to the Y-axis rotation position detection Hall element H2 (step S24). The specific method of calculating the movement amount in step S24 is the same as that in step S22, and thus, description thereof will be omitted.

Referring back to FIG. 14, after step S2, the system controller 108 calculates the movement amount of the Y-axis rotation position detection Hall element H3 based on the output signal of the Y-axis rotation position detection Hall element H3, the data set corresponding to the Y-axis rotation position detection Hall element H3, and the position in the direction X provisionally decided in step S1 (step S3).

Figure 16:
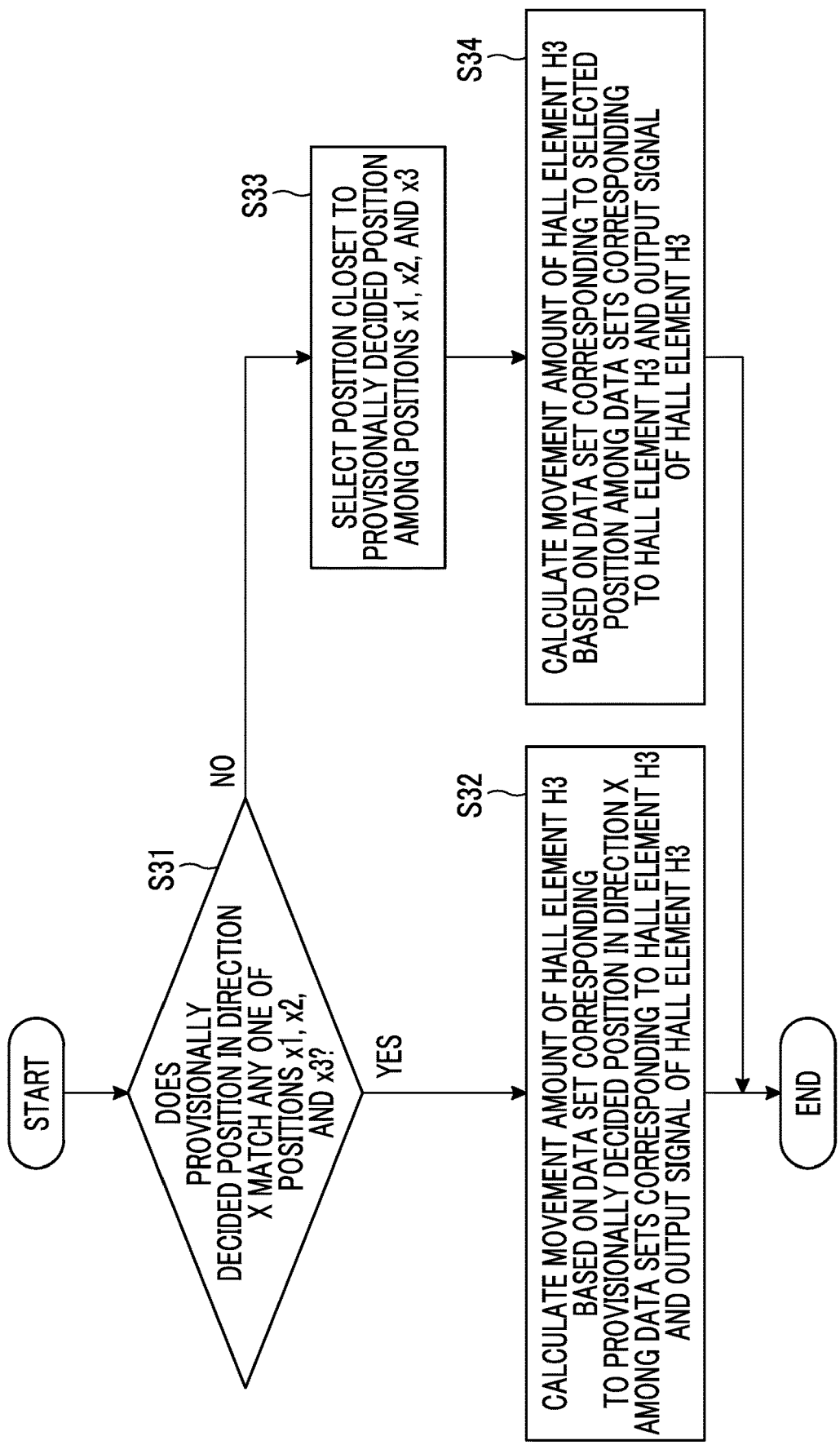
FIG. 16 is a flowchart showing details of step S3 shown in FIG. 14.

FIG. 16 is a flowchart showing details of step S3 shown in FIG. 14.

The system controller 108 determines whether or not the position in the direction X provisionally decided in step S1 matches any one of the position x1, the position x2, and the position x3 (step S31).

In a case where the determination of step S31 is YES, the system controller 108 calculates the movement amount of the Y-axis rotation position detection Hall element H3 in the direction Y based on the output signal of the Y-axis rotation position detection Hall element H3 and the data set corresponding to the position provisionally decided in step S1 among the data sets corresponding to the Y-axis rotation position detection Hall element H3 (step S32).

Specifically, the system controller 108 acquires the output signal of the Y-axis rotation position detection Hall element H3, and specifies the division region to which this output signal belongs among the division regions RG1, RG2, and RG3. The system controller 108 reads out the function corresponding to the specified division region in the corresponding data set. The system controller 108 obtains the movement amount of the Y-axis rotation position detection Hall element H3 in the direction Y from the reference state from the readout function and the acquired output signal.

In a case where the determination of step S31 is NO, the system controller 108 selects a position closest to the position provisionally decided in step S1 among the position x1, the position x2, and the position x3 (step S33). In a case where there are two closest positions, one of the two positions may be selected.

The system controller 108 calculates the movement amount of the Y-axis rotation position detection Hall element H3 in the direction Y based on the output signal of the Y-axis rotation position detection Hall element H3 and the data set corresponding to the position selected in step S33 among the data sets corresponding to the Y-axis rotation position detection Hall element H3 (step S34). The specific method of calculating the movement amount in step S34 is the same as that in step S32, and thus, description thereof will be omitted.

Referring back to FIG. 14, after step S3, the system controller 108 detects the position of the movable member 2 in the direction Y and the position of the movable member 2 in the direction θ based on the movement amount calculated in step S2 and the movement amount calculated in step S3 (step S4).

For example, in a case where the movement amount calculated in step S2 and the movement amount calculated in step S3 have the same value, the position of the movable member 2 in the direction Y is decided from any of these movement amounts, and a rotation amount is decided as zero.

Alternatively, in a case where the movement amount calculated in step S2 and the movement amount calculated in step S3 have different values, an intermediate position of the position in the direction Y decided by each of these two movement amounts is decided as the position in the direction Y. The rotation amount is decided by a magnitude relationship between these two movement amounts.

After step S4, the system controller 108 detects the position of the movable member 2 in the direction X based on the position in the direction Y detected in step S4, the output signal of the X-axis position detection Hall element H1, and the data set corresponding to the X-axis position detection Hall element H1 (step S5).

Figure 17:
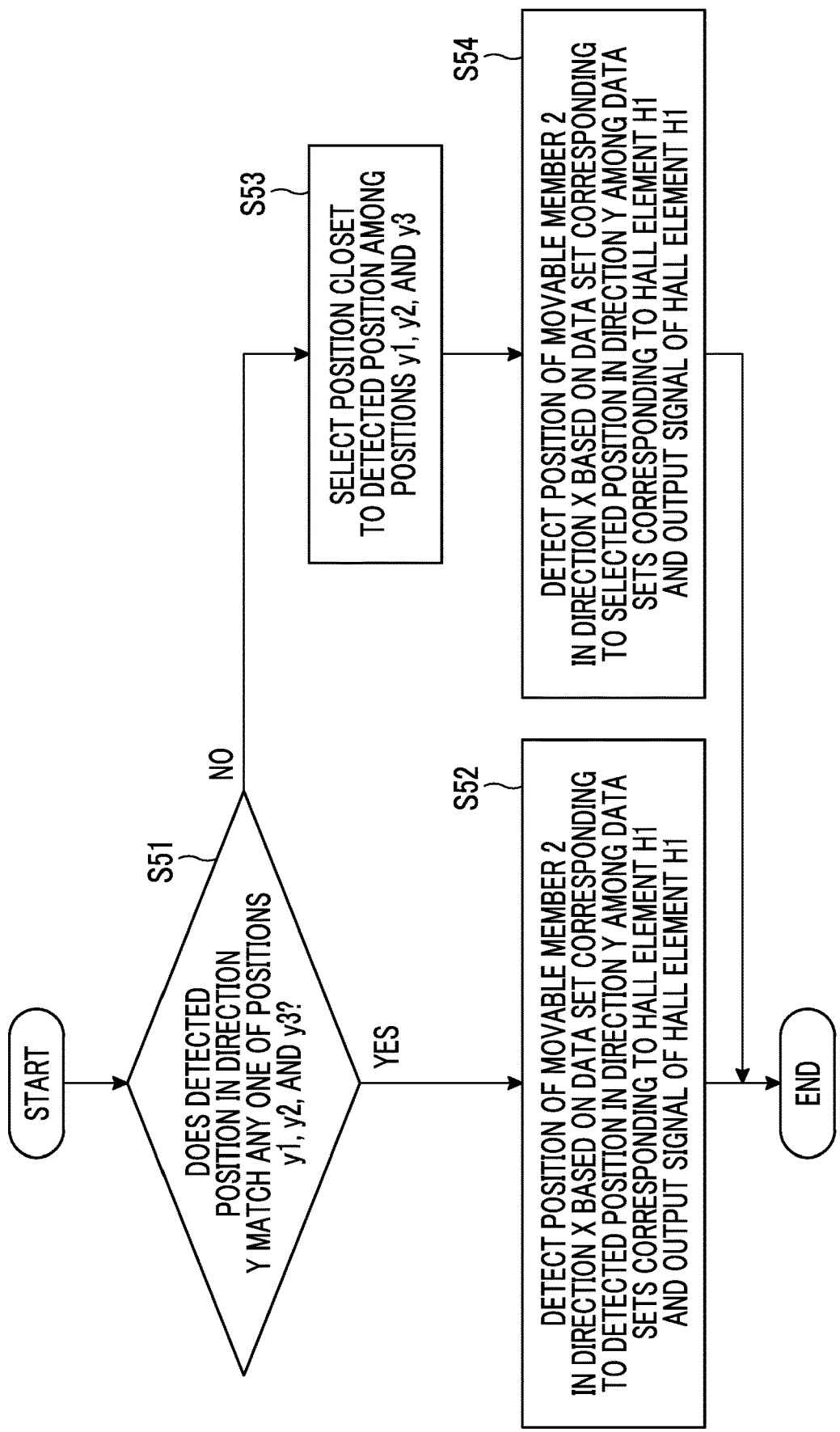
FIG. 17 is a flowchart showing details of step S5 shown in FIG. 14.

FIG. 17 is a flowchart showing details of step S5 shown in FIG. 14.

The system controller 108 determines whether or not the position in the direction Y detected in step S4 matches any one of the position y1, the position y2, and the position y3 (step S51).

In a case where the determination of step S51 is YES, the system controller 108 calculates the movement amount of the X-axis position detection Hall element H1 in the direction X based on the output signal of the X-axis position detection Hall element H1 and the data set corresponding to the position detected in step S5 among the data sets corresponding to the X-axis position detection Hall element H1, and detects the position of the movable member 2 in the direction X from this movement amount (step S52). The specific method of calculating the movement amount in step S52 is the same as that in step S22, and thus, description thereof will be omitted.

In a case where the determination of step S51 is NO, the system controller 108 selects a position closest to the position detected in step S5 among the position y1, the position y2, and the position y3 (step S53). In a case where there are two closest positions, one of the two positions may be selected.

The system controller 108 calculates the movement amount of the X-axis position detection Hall element H1 in the direction X based on the output signal of the X-axis position detection Hall element H1 and the data set corresponding to the position selected in step S53 among the data sets corresponding to the X-axis position detection Hall element H1, and detects the position of the movable member 2 in the direction X from this movement amount (step S54). The specific method of calculating the movement amount in step S54 is the same as that in step S22, and thus, description thereof will be omitted.

As described above, according to the digital camera 100, the data set corresponding to the X-axis position detection Hall element H1 stored in the memory 109 is not a single data set, but is a plurality of data sets obtained for the plurality of positions of the movable member 2 in the direction Y. In a case where the position of the movable member 2 in the direction X is detected, the data set corresponding to the position of the movable member 2 in the direction Y decided in advance or a position closest to the this position is used among the data sets corresponding to the X-axis position detection Hall element H1. Thus, the position of the movable member 2 in the direction X can be detected with high accuracy.

According to the digital camera 100, the data set corresponding to the Y-axis rotation position detection Hall element H2 (or H3) stored in the memory 109 is not a single data set, but is a plurality of data sets obtained for the plurality of positions of the movable member 2 in the direction X. In a case where the position of the movable member 2 in the direction Y is detected, the data set corresponding to the position of the movable member 2 in the direction X provisionally decided in advance and a position closest to this position is used among the data sets corresponding to the Y-axis rotation position detection Hall element H2 (or H3). Therefore, the movement amount of the Y-axis rotation position detection Hall element H2 (or H3) in the direction Y can be calculated with high accuracy, and thus, the position of the movable member 2 in the direction Y and the direction θ can be detected with accuracy.

The data set corresponding to each Hall element stored in the memory 109 is constituted by a plurality of linear functions. Thus, the position of the movable member 2 can be detected with higher accuracy than in a case where the output characteristics of the Hall element are approximated by one function.

Figure 18:
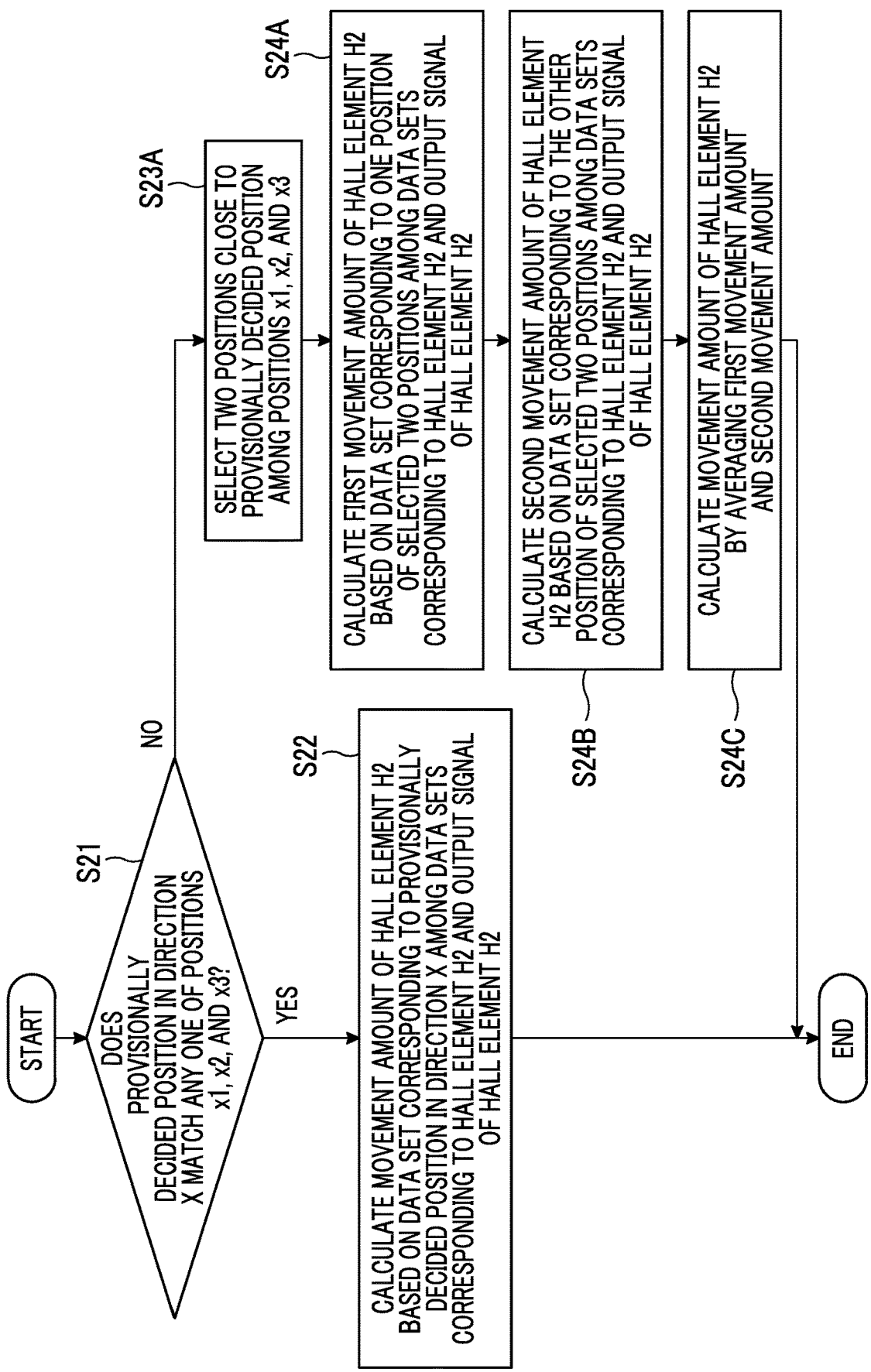
FIG. 18 is a flowchart showing a modification example of the details of step S2 shown in FIG. 14.

FIG. 18 is a flowchart showing a modification example of the details of step S2 shown in FIG. 14. In FIG. 18, the same steps as those in FIG. 15 are denoted by the same references, and the description will be omitted. The flowchart shown in FIG. 18 is the same as that of FIG. 15 except that step S23 is changed to step S23A and step S24 is changed to step S24A to step S24C.

In a case where the determination of step S21 is NO, the system controller 108 selects two positions close to the position provisionally decided in step S1 from the position x1, the position x2, and the position x3 (step S23A).

The system controller 108 calculates a first movement amount of the Y-axis rotation position detection Hall element H2 in the direction Y based on the output signal of the Y-axis rotation position detection Hall element H2 and the data set corresponding to one position of the two positions selected in step S23A among the data sets corresponding to the Y-axis rotation position detection Hall element H2 (step S24A). The specific method of calculating the movement amount in step S24A is the same as that in step S22, and thus, description thereof will be omitted.

The system controller 108 also calculates a second movement amount of the Y-axis rotation position detection Hall element H2 in the direction Y based on the output signal of the Y-axis rotation position detection Hall element H2 and the data set corresponding to the other position of the two positions selected in step S23A among the data sets corresponding to the Y-axis rotation position detection Hall element H2 (step S24B). The specific method of calculating the movement amount in step S24B is the same as that in step S22, and thus, description thereof will be omitted.

Subsequently, the system controller 108 calculates an average of the first movement amount calculated in step S24A and the second movement amount calculated in step S24B as the movement amount of the Y-axis rotation position detection Hall element H2 in the direction Y (step S24C).

In step S24C, the system controller 108 may calculate the movement amount of the Y-axis rotation position detection Hall element H2 in the direction Y by a weighted average of the first movement amount and the second movement amount.

For example, a case where the positions selected in step S23A are the position x1 and the position x2 will be described. In this case, the first movement amount is calculated based on the data set DS4 corresponding to the position x1 and the output signal of the Y-axis rotation position detection Hall element H2, and the second movement amount is calculated based on the data set DS5 corresponding to the position x2 and the output signal of the Y-axis rotation position detection Hall element H2.

Here, a ratio between a distance between the position x1 and the position provisionally decided in step S1 and a distance between the position x2 and the position provisionally decided in step S1 is a:b.

In this case, in step S24C, the system controller 108 calculates the movement amount of the Y-axis rotation position detection Hall element H2 in the direction Y by performing the weighted average using the following calculation.

movement amount={(first movement amount)×a+ (second movement amount)×b}/(a+b)

It is possible to more accurately calculate the movement amount of the Y-axis rotation position detection Hall element H2 in the direction Y by performing the weighted average in this manner.

The method of calculating the movement amount described in step S23A and S24A to S24C of FIG. 18 can be similarly applied to the method of calculating the movement amount in steps S33 and S34 shown in FIG. 16 and the method of calculating the movement amount in steps S53 and S54 shown in FIG. 17.

As described above, due to the adoption of the method of calculating the movement amount described in steps S23A, and steps S24A to S24C of FIG. 18, the movement amount of the movable member 2 can be more accurately calculated, and the position detection accuracy of the movable member 2 can be improved.

As shown in FIG. 4, in the image shake correction mechanism 3, the position detection magnet Mh2 of the position detection magnets Mh1, Mh2, and Mh3 is disposed at a position so as to be closer to the drive magnets Mv1, Mv2, Mv3, mv1, mv2, and mv3 than the other position detection magnets Mh1 and Mh3.

Thus, a change in the output characteristic curve of the Y-axis rotation position detection Hall element H2 due to the difference in the position of the movable member 2 is larger than changes in the X-axis position detection Hall element H1 and the Y-axis rotation position detection Hall element H3.

Therefore, only one data set may be stored for each of the X-axis position detection Hall element H1 and the Y-axis rotation position detection Hall element H3, and the plurality of data sets may be stored only for the Y-axis rotation position detection Hall element H2.

For example, the data set DS2 shown in FIG. 11, the data sets DS4 to DS6 shown in FIG. 12, and the data set DS8 shown in FIG. 13 may be stored in the ROM of the memory 109.

The position detection operation by the system controller 108 in this configuration is as follows.

That is, step S5 is deleted in the flowchart of FIG. 14, and in step S1, the system controller 108 detects the position of the movable member 2 in the direction X based on the data set DS2 and the output of the X-axis position detection Hall element H1.

In step S2, the system controller 108 calculates the movement amount of the Y-axis rotation position detection Hall element H2 based on the position in the direction X detected in step S1, the data sets DS4 to DS6 corresponding to the Y-axis rotation position detection Hall element H2, and the output of the Y-axis rotation position detection Hall element H2.

In step S3, the system controller 108 calculates the movement amount of the Y-axis rotation position detection Hall element H3 based on the data set corresponding to the Y-axis rotation position detection Hall element H3 and the output of the Y-axis rotation position detection Hall element H3.

Even in such a configuration, the position detection accuracy of the movable member 2 can be improved. According to this configuration, the capacity of the ROM of the memory 109 can be reduced. A time required for creating the data set can be reduced.

The system controller 108 detects the position of the movable member 2 in the direction Y and the position thereof in the direction θ based on the outputs of the Y-axis rotation position detection Hall element H2 and the Y-axis rotation position detection Hall element H3. Thus, it is preferable that the calculation accuracy of the movement amount of the Y-axis rotation position detection Hall element H2 is the same as the calculation accuracy of the movement amount of the Y-axis rotation position detection Hall element H3.

Therefore, it is preferable that only one data set is stored for the X-axis position detection Hall element H1 and the plurality of data sets is stored for each of the Y-axis rotation position detection Hall element H2 and the Y-axis rotation position detection Hall element H3.

The digital camera 100 may be an interchangeable lens type in which the imaging lens 101 can be exchanged for another one. In this case, the resolution required for detecting the position of the movable member 2 is changed depending on a type of the imaging lens 101.

Therefore, a plurality of types of data sets may be stored in the ROM of the memory 109 so as to correspond to the types of the imaging lens 101 attached to the digital camera 100, and the position detection processing of the movable member 2 may be executed by using the data set corresponding to the type of the attached imaging lens 101.

Figure 19:
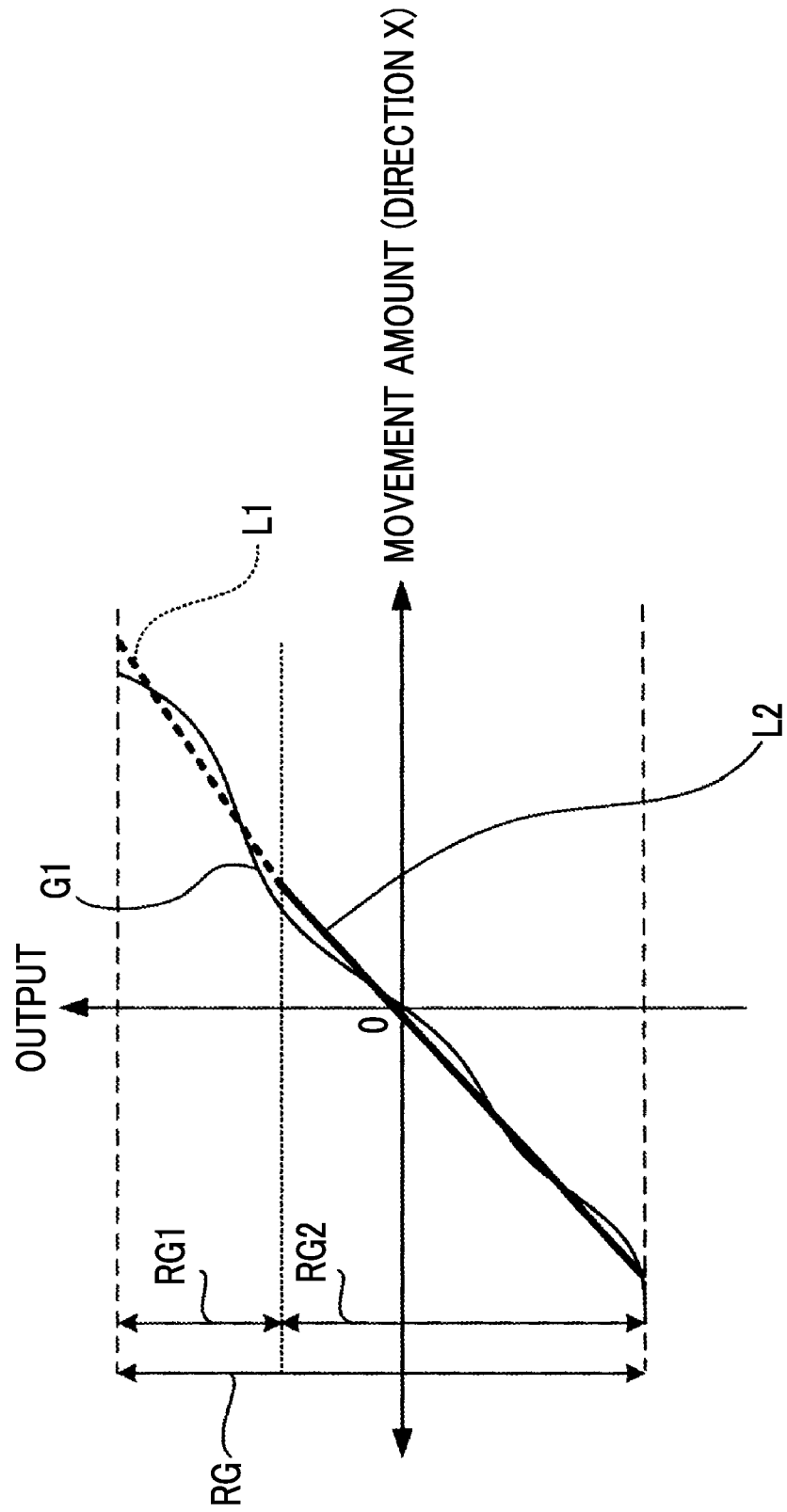
FIG. 19 is a diagram for describing another configuration example of the data set corresponding to the X-axis position detection Hall element H1.

FIG. 19 is a diagram for describing another configuration example of the data set corresponding to the X-axis position detection Hall element H1.

In the example shown in FIG. 19, the detection range RG of the X-axis position detection Hall element H1 is divided into two regions including the division region RG1 and the division region RG2. The output characteristic curve G1 is stored as the set of two linear functions including the linear approximate function indicated by the straight line L1 approximated from the curve in the division region RG1 and the linear approximate function indicated by the straight line L2 approximated from the curve in the division region RG2 in the ROM of the memory 109.

The system controller 108 performs position detection by using the data set having the linear function for each of the three division regions shown in FIG. 10 in a case where the imaging lens 101 that requires high position detection resolution is attached to the digital camera 100, and performs position detection by using the data set having the linear function for each of the two division regions shown in FIG. 19 in a case where the imaging lens 101 that does not require high position detection resolution is attached to the digital camera 100.

In this manner, the calculation amount for the position detection can be optimized according to the type of the imaging lens 101.

Although the image shake correction mechanism 3 performs the image shake correction by moving the movable member 2 in three directions of the direction X, the direction Y, and the direction θ, the image shake correction mechanism may perform the image shake correction by moving the movable member 2 in two directions of the direction X and the direction Y.

For example, in a case where the image shake correction mechanism 3 does not to move the movable member 2 in the direction θ, the pair of the Y-axis rotation position detection magnet Mh2 and the Y-axis rotation position detection Hall element H2 may be removed, and the pair of the X-axis rotation drive magnet Mv1 and the X-axis rotation drive coil C1 may be removed.

In the position detection operation in this configuration, step S2 of FIG. 14 is deleted, and in step S4, the position of the movable member 2 in the direction Y is detected based on the movement amount calculated in step S3.

In this configuration, the Y-axis rotation position detection magnet Mh3 is disposed to be closer to the drive magnet than the X-axis position detection magnet Mh1. Thus, the position detection accuracy of the movable member 2 can be improved by storing the plurality of data sets at least for the Y-axis rotation position detection Hall element H3.

The effects described above can be similarly obtained even in the configuration in which the drive magnets and the position detection magnets are fixed to the movable member 2, and the X-axis rotation drive coil C1, the X-axis rotation drive coil C2, the Y-axis drive coil C3, the X-axis position detection Hall element H1, the Y-axis rotation position detection Hall element H2, and the Y-axis rotation position detection Hall element H3 are fixed to the first support member 1A.

Although the image shake correction mechanism 3 corrects image shake by moving the imaging element 20, the aforementioned position detection method is effective in a device that corrects image shake by moving, as the movable member, a correction lens included in the imaging lens 101.

The position detection element mounted on the image shake correction mechanism 3 is not limited to the Hall element as long as the position detection element can detect the magnetic field information from the magnet. For example, a magnetic resistance element, a magnet impedance element, or an inductance sensor may be used.

It has been described that each of the plurality of data sets corresponding to each of the X-axis position detection Hall element H1, the Y-axis rotation position detection Hall element H2, and the Y-axis rotation position detection Hall element H3 includes the plurality of linear functions.

However, each of the plurality of data sets corresponding to the X-axis position detection Hall element H1 may be obtained by approximating the output characteristic curve of the X-axis position detection Hall element H1 by one function.

Similarly, each of the plurality of data sets corresponding to the Y-axis rotation position detection Hall element H2 may be obtained by approximating the output characteristic curve of the Y-axis rotation position detection Hall element H2 by one function.

Similarly, each of the plurality of data sets corresponding to the Y-axis rotation position detection Hall element H3 may be obtained by approximating the output characteristic curve of the Y-axis rotation position detection Hall element H3 by one function.

As described above, even though the data set includes one function, an approximate function for each of the plurality of positions is stored for each Hall element. Thus, it is possible to improve the position detection accuracy of the movable member 2 by calculating the movement amount of the movable member 2 by using the optimal approximate function.

Next, a configuration of a smartphone will be described as another embodiment of the imaging device of the present invention.

Figure 20:
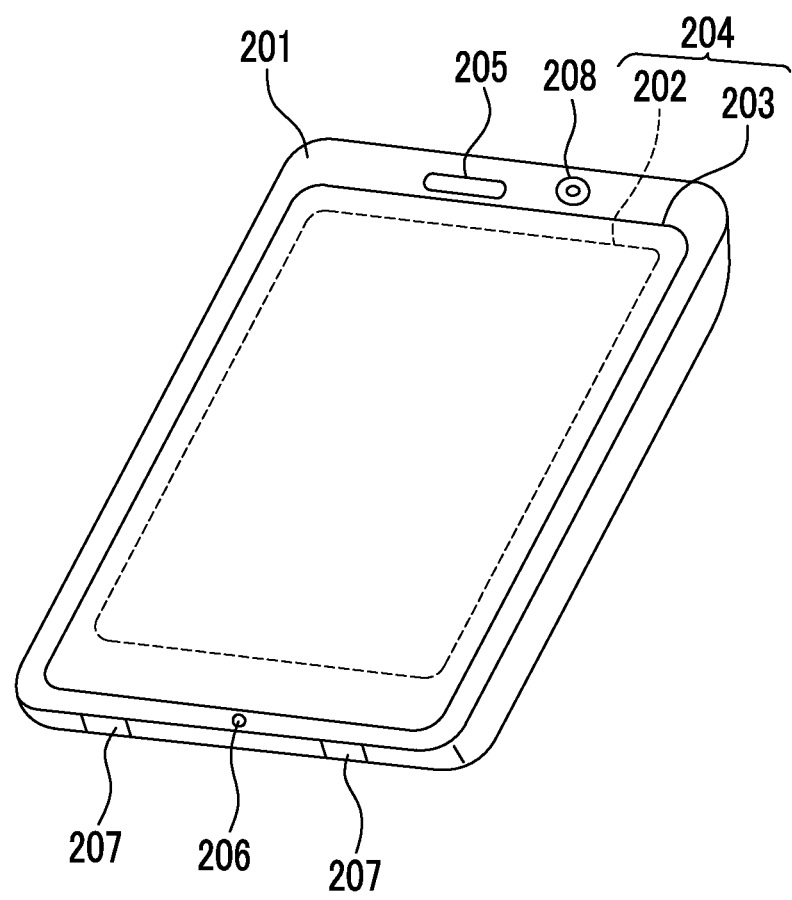
FIG. 20 shows an appearance of a smartphone 200 that is an embodiment of the imaging device of the present invention.

FIG. 20 shows an appearance of a smartphone 200 that is an embodiment of the imaging device of the present invention.

A smartphone 200 shown in FIG. 20 includes a flat plate casing 201, and comprises a display input unit 204 in which a display panel 202 as a display surface and an operation panel 203 as an input unit are integrated on one surface of the casing 201.

Such a casing 201 comprises a speaker 205, a microphone 206, an operation unit 207, and a camera unit 208.

The configuration of the casing 201 is not limited thereto, and for example, a configuration in which the display surface and the input unit are independent can be employed, or a configuration having a folding structure or a slide mechanism can be employed.

Figure 21:
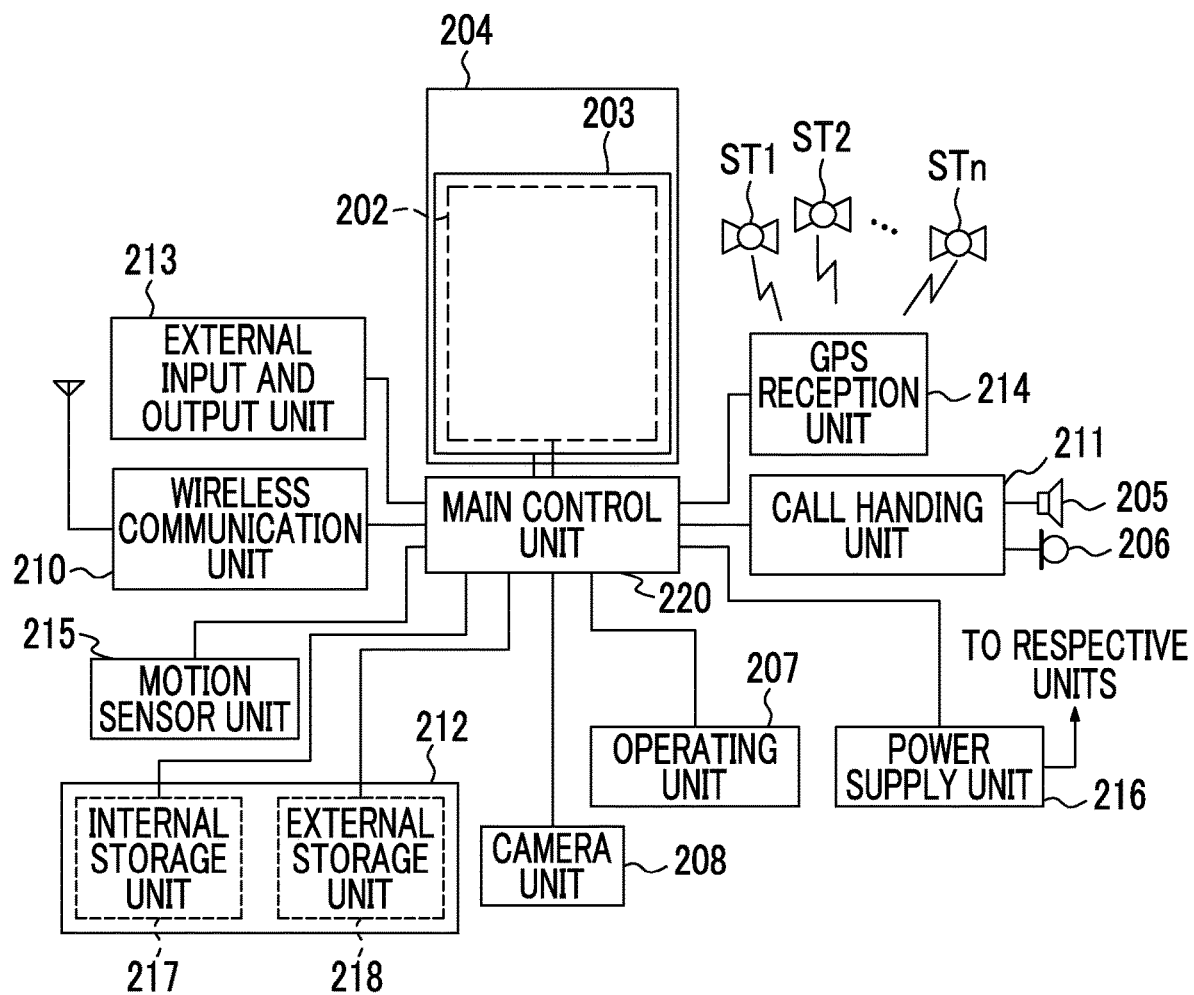
FIG. 21 is a block diagram showing a configuration of the smartphone 200 shown in FIG. 20.

FIG. 21 is a block diagram showing a configuration of the smartphone 200 shown in FIG. 20.

As shown in FIG. 21, the smartphone comprises, as main components, a wireless communication unit 210, the display input unit 204, a call handling unit 211, the operation unit 207, the camera unit 208, a storage unit 212, an external input and output unit 213, a Global Positioning System (GPS) reception unit 214, a motion sensor unit 215, a power supply unit 216, and a main controller 220.

The smartphone 200 has, as a main function, a wireless communication function of performing mobile wireless communication through a base station apparatus BS (not shown) and a mobile communication network NW (not shown).

The wireless communication unit 210 performs wireless communication with the base station apparatus BS belonging to the mobile communication network NW according to an instruction of the main controller 220. The transmission and reception of various file data such as voice data, image data, and e-mail data, and reception of Web data or streaming data are performed by using this wireless communication.

Under the control of the main controller 220, the display input unit 204 displays images (still images and moving images) or text information, and visually transfers information to the user, and is a so-called touch panel that detects a user operation for the displayed information. The display input unit comprises the display panel 202 and the operation panel 203.

The display panel 202 uses, as a display device, a liquid crystal display (LCD) or an organic electro-luminescence display (OELD).

The operation panel 203 is a device that is mounted so as to visually recognize the image displayed on the display surface of the display panel 202, and detects one or a plurality of coordinates operated by a finger of the user or a stylus. In a case where this device is operated by the finger of the user or the stylus, a detection signal generated due to the operation is output to the main controller 220. Subsequently, the main controller 220 detects an operation position (coordinates) on the display panel 202 based on the received detection signal.

As shown in FIG. 21, although it has been described that the display panel 202 and the operation panel 203 of the smartphone 200 shown as the embodiment of the imaging device of the present invention are integrally formed and constitute the display input unit 204, the operation panel 203 is disposed to completely cover the display panel 202.

In a case where such an arrangement is adopted, the operation panel 203 may comprise a function of detecting the user operation even in a region outside the display panel 202. In other words, the operation panel 203 may have a detection region (hereinafter, referred to as a display region) for an overlapped portion which overlaps with the display panel 202 and a detection region (hereinafter, referred to as a non-display region) for an outer edge portion which does not overlap with the display panel 202.

The size of the display region and the size of the display panel 202 may completely match each other, and it is not necessary to match both the sizes.

The operation panel 203 may comprise the outer edge portion and two sensitive regions which are inner portions other than the outer edge portion. A width of the outer edge portion is appropriately designed according to the size of the casing 201.

Examples of the position detection method employed in the operation panel 203 include a matrix switch method, a resistive film method, a surface acoustic wave method, an infrared method, an electromagnetic induction method, and an electrostatic capacitance method.

The call handling unit 211 comprises the speaker 205 or the microphone 206, converts the voice of the user input through the microphone 206 into voice data capable of being processed by the main controller 220 to output the voice data to the main controller 220 or decodes the voice data received by the wireless communication unit 210 or the external input and output unit 213 to output the decoded voice data from the speaker 205.

For example, as shown in FIG. 20, the speaker 205 may be mounted on the same surface as the surface on which the display input unit 204 is provided, and the microphone 206 may be mounted on a side surface of the casing 201.

The operation unit 207 is a hardware key using a key switch, and receives an instruction from the user.

For example, as shown in FIG. 20, the operation unit 207 is a push button type switch which is mounted on a side surface of the casing 201 of the smartphone 200, and is turned on by being pressed with the finger and is turned off by a restoring force such as a spring in a case where the finger is released.

The storage unit 212 stores a control program and control data of the main controller 220, application software, address data associated with a name or a telephone number of a communication partner, the transmitted and received e-mail data, Web data downloaded by Web browsing, and download content data, and temporarily stores streaming data. The storage unit 212 includes an internal storage unit 217 built in the smartphone, and an external storage unit 218 having an external memory detachably attached via a slot.

The internal storage unit 217 and the external storage unit 218 constituting the storage unit 212 is realized by using a storage medium such as a memory (for example, MicroSD (registered trademark) memory) of a flash memory type, a hard disk type, a multimedia card micro type, or a card type, a random access memory (RAM), or a read only memory (ROM).

The external input and output unit 213 serves as an interface with all external devices coupled to the smartphone 200, and directly or indirectly communicates with other external devices by (for example, universal serial bus (USB) or IEEE 1394) or a network (for example, Internet, wireless LAN, Bluetooth (registered trademark), radio frequency identification (RFID), Infrared Data Association (IrDA) (registered trademark), ultra wideband (UWB) (registered trademark), or ZigBee (registered trademark).

Examples of the external device to be connected to the smartphone 200 includes a wired or wireless headset, an external wired or wireless charger, a wired or wireless data port, a memory card to be connected through a card socket, subscriber identity module (SIM)/user identity module (UIM) card, or an external audio and video device to be connected through an audio and video input and output (I/O) terminal, an external audio and video device to be connected in a wireless manner, a smartphone to be connected in a wired or wireless manner, a personal computer to be connected in a wired or wireless manner, or an earphone to be connected in a wired or wireless manner.

The external input and output unit 213 can transfer data transmitted from the external devices to the components in the smartphone 200 or can transmit data in the smartphone 200 to the external devices.

The GPS reception unit 214 receives GPS signals transmitted from GPS satellites ST1 to STn according to an instruction of the main controller 220, performs positioning calculation processing based on a plurality of received GPS signals, and detects the position of the smartphone 200 consisting of latitude, longitude, and altitude.

In a case where positional information can be acquired from the wireless communication unit 210 or the external input and output unit 213 (for example, a wireless LAN), the GPS reception unit 214 can detect the position by using the positional information.

For example, the motion sensor unit 215 comprises a three-axis acceleration sensor, and detects physical motion of the smartphone 200 according to an instruction of the main controller 220.

The movement direction or acceleration of the smartphone 200 is detected by detecting the physical motion of the smartphone 200. The detection result is output to the main controller 220.

The power supply unit 216 supplies power stored in a battery (not shown) to the respective units of the smartphone 200 according to an instruction of the main controller 220.

The main controller 220 comprises a microprocessor, operates according to the control program or control data stored in the storage unit 212, and integrally controls the units of the smartphone 200.

The main controller 220 has a mobile communication control function of controlling the units of a communication system in order to perform voice communication or data communication through the wireless communication unit 210, and an application processing function.

The application processing function is realized by the main controller 220 operating according to application software stored in the storage unit 212.

The application processing function is, for example, an infrared communication function of controlling the external input and output unit 213 to perform data communication with a device facing the smartphone, an e-mail function of transmitting and receiving e-mails, or a Web browsing function of browsing Web pages.

The main controller 220 has an image processing function of displaying video on the display input unit 204 based on image data (still image or moving image data), such as received data or downloaded streaming data.

The image processing function refers to a function of the main controller 220 decoding the image data, performing image processing on the decoding result, and displaying an image on the display input unit 204.

The main controller 220 performs display control on the display panel 202 and operation detection control for detecting a user operation through the operation unit 207 and the operation panel 203.

Through the performing of the display control, the main controller 220 displays an icon for activating application software or a software key, such as a scroll bar, or displays a window for creating e-mails.

The scroll bar refers to a software key for receiving an instruction to move a display portion of an image which is too large to fit into the display region of the display panel 202.

Through the performing of the operation detection control, the main controller 220 detects the user operation through the operation unit 207, receives an operation on the icon or an input of a character string in an input field of the window through the operation panel 203, or receives a scroll request of a display image through the scroll bar.

Through the performing of the operation detection control, the main controller 220 has a touch panel control function of determining whether or not an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main controller 220 may detect a gesture operation on the operation panel 203 and may execute a function set in advance according to the detected gesture operation.

The gesture operation is not a conventional simple touch operation, but means an operation to render a track with a finger, an operation to simultaneously designate a plurality of positions, or an operation to render a track for at least one of a plurality of positions by combining the aforementioned operations.

The camera unit 208 includes components other than the motion detection sensor 106, the system controller 108, and the image processing unit 107 of the digital camera 100 shown in FIG. 1.

In the smartphone 200, the main controller 220 controls the image shake correction mechanism 3 based on information from the motion sensor unit 215 corresponding to the motion detection sensor 106 to perform image shake correction.

Captured image data generated by the camera unit 208 can be stored in the storage unit 212 or can be output through the external input and output unit 213 or the wireless communication unit 210.

Although it has been described in the smartphone 200 shown in FIG. 20 that the camera unit 208 is mounted on the same surface as the display input unit 204, the mounting position of the camera unit 208 is not limited thereto, and the camera unit may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS reception unit 214 detects the position, the position may be detected by referring to an image from the camera unit 208. The optical axis direction of the camera unit 208 of the smartphone 200 can be determined or a current usage environment may be determined by referring to an image from the camera unit 208 without using the three-axis acceleration sensor or in combination with the three-axis acceleration sensor. An image from the camera unit 208 may be used in application software.

Image data of a still image or a motion picture may be attached with positional information acquired by the GPS reception unit 214, voice information (which may be converted to text information through voice-text conversion by the main controller) acquired by the microphone 206, or posture information acquired by the motion sensor unit 215 and can be recorded in the storage unit 212, or may be output through the external input and output unit 213 or the wireless communication unit 210.

As described above, the following items are disclosed in this specification.

(1) There is provided an image shake correction device comprising a movable member to which a lens or an imaging element is fixed, a support member that supports the movable member in a movable manner in a first direction and a second direction perpendicular to each other along a plane, a first magnetic field detection element that detects a movement amount of the movable member in the first direction and a second magnetic field detection element that detects a movement amount of the movable member in the second direction, the first and second magnetic field detection elements being fixed to one of the movable member and the support member, a first magnet that faces the first magnetic field detection element, and a second magnet that faces the second magnetic field detection element, the first and second magnets being fixed to the other one of the movable member and the support member, a storage unit that stores a relationship between the movement amount of the movable member in the first direction and magnetic field information detected by the first magnetic field detection element, as a first set of linear functions corresponding to each division region in a case where a detection range of the magnetic field information detected by the first magnetic field detection element is divided into a plurality of division regions, stores the first set in association with each of a plurality of positions of the movable member in the second direction, and stores a relationship between the movement amount of the movable member in the second direction and magnetic field information detected by the second magnetic field detection element, as a second set of linear functions corresponding to each division region in a case where a detection range of the magnetic field information detected by the second magnetic field detection element is divided into a plurality of division regions; and a position detection unit that detects a position of the movable member in the second direction by using the magnetic field information detected by the second magnetic field detection element and the linear functions of the second set corresponding to the division region to which the magnetic field information belongs, and detects a position of the movable member in the first direction based on the position of the movable member in the second direction, the first set, and the magnetic field information detected by the first magnetic field detection element.

(2) In the image shake correction device according to (1), in a case where the detected position of the movable member in the second direction does not match each of the plurality of positions in the second direction, the position detection unit detects the position of the movable member in the first direction by using the linear functions, which are included in the first set corresponding to a position closest to the position of the movable member in the second direction among the plurality of positions in the second direction and correspond to the division region to which the magnetic field information detected by the first magnetic field detection element belongs, and the magnetic field information detected by the first magnetic field detection element.

(3) In the image shake correction device according to (1), in a case where the detected position of the movable member in the second direction does not match each of the plurality of positions in the second direction, the position detection unit calculates a first movement amount of the movable member in the first direction by using the linear functions, which are included in the first set corresponding to one of two positions close to the position of the movable member in the second direction among the plurality of positions in the second direction and correspond to the division region to which the magnetic field information detected by the first magnetic field detection element belongs, and the magnetic field information detected by the first magnetic field detection element, calculates a second movement amount of the movable member in the first direction by using the linear functions, which are included in the first set corresponding to the other one of the two positions and correspond to the division region to which the magnetic field information detected by the first magnetic field detection element belongs, and the magnetic field information detected by the first magnetic field detection element, and detects the position of the movable member in the first direction based on a movement amount obtained by averaging the first movement amount and the second movement amount.

(4) In the image shake correction device according to any one of (1) to (3), in a case where the detected position of the movable member in the second direction matches each of the plurality of positions in the second direction, the position detection unit detects the position of the movable member in the first direction by using the linear functions, which are included in the first set corresponding to the matched position and correspond to the division region to which the magnetic field information detected by the first magnetic field detection element belongs, and the magnetic field information detected by the first magnetic field detection element.

(5) The image shake correction device according to any one of (1) to (4) further comprises a plurality of drive magnets that is fixed to the other one of the movable member and the support member, and moves the movable member in the first direction and the second direction, in which the first magnet is disposed to be closer to the drive magnets than the second magnet.

(6) In the image shake correction device according to any one of (1) to (5), the storage unit stores the second set in association with each of a plurality of positions of the movable member in the first direction, and the position detection unit provisionally decides the position of the movable member in the second direction by using the magnetic field information detected by the second magnetic field detection element and the linear functions, which are included in any one of the second sets for the plurality of positions in the first direction and correspond to the division region to which the magnetic field information belongs, detects the position of the movable member in the first direction based on the provisionally decided position of the movable member in the second direction, the first set, and the magnetic field information detected by the first magnetic field detection element, and detects the position of the movable member in the second direction based on the position of the movable member in the first direction, the second set, and the magnetic field information detected by the second magnetic field detection element.

(7) In the image shake correction device according to any one of (1) to (6), the sets of the linear functions stored in the storage unit include a plurality of types of sets in which a total number of linear functions is different, the movable member has the imaging element fixed thereto, and the position detection unit detects the position of the movable member by using the set corresponding to a type of a lens disposed in front of the imaging element among the plurality of types of sets.

(8) There is provided an imaging device comprising the image shake correction device according to any one of (1) to (7).

(9) There is provided a position detection method of detecting a position of a movable member in an image shake correction device that includes the movable member to which a lens or an imaging element is fixed, a support member that supports the movable member in a movable manner in a first direction and a second direction perpendicular to each other along a plane, a first magnetic field detection element that detects a movement amount of the movable member in the first direction and a second magnetic field detection element that detects a movement amount of the movable member in the second direction, the first and second magnetic field detection elements being fixed to one of the movable member and the support member, and a first magnet that faces the first magnetic field detection element, and a second magnet that faces the second magnetic field detection element, the first and second magnets being fixed to the other one of the movable member and the support member. The method comprises a position detection step of reading out a second set of linear functions from a storage unit that stores a relationship between the movement amount of the movable member in the first direction and magnetic field information detected by the first magnetic field detection element, as a first set of linear functions corresponding to each division region in a case where a detection range of the magnetic field information detected by the first magnetic field detection element is divided into a plurality of division regions, stores the first set in association with each of a plurality of positions of the movable member in the second direction, and stores a relationship between the movement amount of the movable member in the second direction and magnetic field information detected by the second magnetic field detection element, as the second set of the linear functions corresponding to each division region in a case where a detection range of the magnetic field information detected by the second magnetic field detection element is divided into a plurality of division regions, detecting a position of the movable member in the second direction by using the magnetic field information detected by the second magnetic field detection element and the linear functions of the second set corresponding to the division region to which the magnetic field information belongs, and detecting a position of the movable member in the first direction based on the position of the movable member in the second direction, the first set read out from the storage unit, and the magnetic field information detected by the first magnetic field detection element.

(10) In the position detection method according to (9), in the position detection step, in a case where the detected position of the movable member in the second direction does not match each of the plurality of positions in the second direction, the position of the movable member in the first direction is detected by using the linear functions, which are included in the first set corresponding to a position closest to the position of the movable member in the second direction among the plurality of positions in the second direction and correspond to the division region to which the magnetic field information detected by the first magnetic field detection element belongs, and the magnetic field information detected by the first magnetic field detection element.

(11) In the position detection method according to (9), in the position detection step, in a case where the detected position of the movable member in the second direction does not match each of the plurality of positions in the second direction, a first position of the movable member in the first direction is calculated by using the linear functions, which are included in the first set corresponding to one of two positions close to the position of the movable member in the second direction among the plurality of positions in the second direction and correspond to the division region to which the magnetic field information detected by the first magnetic field detection element belongs, and the magnetic field information detected by the first magnetic field detection element, a second position of the movable member in the first direction is calculated by using the linear functions, which are included in the first set corresponding to the other one of the two positions and correspond to the division region to which the magnetic field information detected by the first magnetic field detection element belongs, and the magnetic field information detected by the first magnetic field detection element, and a position between the first position and the second position is detected as the position of the movable member in the first direction.

(12) In the position detection method according to any one of (9) to (11), in the position detection step, in a case where the detected position of the movable member in the second direction matches each of the plurality of positions in the second direction, the position of the movable member in the first direction is detected by using the linear functions, which are included in the first set corresponding to the matched position and correspond to the division region to which the magnetic field information detected by the first magnetic field detection element belongs, and the magnetic field information detected by the first magnetic field detection element.

(13) In the position detection method according to any one of (9) to (12), the image shake correction device further comprises a plurality of drive magnets that is fixed to the other one of the movable member and the support member, and moves the movable member in the first direction and the second direction, and the first magnet is disposed to be closer to the drive magnets than the second magnet.

(14) In the position detection method according to any one of (9) to (13), the storage unit stores the second set in association with each of a plurality of positions of the movable member in the first direction, and in the position detection step, the position of the movable member in the second direction is provisionally decided by using the magnetic field information detected by the second magnetic field detection element and the linear functions, which are included in any one of the second sets for the plurality of positions in the first direction and correspond to the division region to which the magnetic field information belongs, the position of the movable member in the first direction is detected based on the provisionally decided position of the movable member in the second direction, the first set, and the magnetic field information detected by the first magnetic field detection element, and the position of the movable member in the second direction is detected based on the position of the movable member in the first direction, the second set, and the magnetic field information detected by the second magnetic field detection element.

(15) In the position detection method according to any one of (9) to (14), the sets of the linear functions stored in the storage unit include a plurality of types of sets in which a total number of linear functions is different, the movable member has the imaging element fixed thereto, and in the position detection step, the position of the movable member is detected by using the set corresponding to a type of a lens disposed in front of the imaging element among the plurality of types of sets.

(16) There is provided a position detection program causing a computer to detect a position of a movable member in an image shake correction device that includes the movable member to which a lens or an imaging element is fixed, a support member that supports the movable member in a movable manner in a first direction and a second direction perpendicular to each other along a plane, a first magnetic field detection element that detects a movement amount of the movable member in the first direction and a second magnetic field detection element that detects a movement amount of the movable member in the second direction, the first and second magnetic field detection elements being fixed to one of the movable member and the support member, and a first magnet that faces the first magnetic field detection element, and a second magnet that faces the second magnetic field detection element, the first and second magnets being fixed to the other one of the movable member and the support member. The program causes the computer to execute a position detection step of reading out a second set of linear functions from a storage unit that stores a relationship between the movement amount of the movable member in the first direction and magnetic field information detected by the first magnetic field detection element, as a first set of linear functions corresponding to each division region in a case where a detection range of the magnetic field information detected by the first magnetic field detection element is divided into a plurality of division regions, stores the first set in association with each of a plurality of positions of the movable member in the second direction, and stores a relationship between the movement amount of the movable member in the second direction and magnetic field information detected by the second magnetic field detection element, as the second set of the linear functions corresponding to each division region in a case where a detection range of the magnetic field information detected by the second magnetic field detection element is divided into a plurality of division regions, detecting a position of the movable member in the second direction by using the magnetic field information detected by the second magnetic field detection element and the linear functions of the second set corresponding to the division region to which the magnetic field information belongs, and detecting a position of the movable member in the first direction based on the position of the movable member in the second direction, the first set read out from the storage unit, and the magnetic field information detected by the first magnetic field detection element.

(17) There is provided an image shake correction device comprising a movable member to which a lens or an imaging element is fixed, a support member that supports the movable member in a movable manner in a first direction and a second direction perpendicular to each other along a plane, a first magnetic field detection element that detects a movement amount of the movable member in the first direction and a second magnetic field detection element that detects a movement amount of the movable member in the second direction, the first and second magnetic field detection elements being fixed to one of the movable member and the support member, a first magnet that faces the first magnetic field detection element, and a second magnet that faces the second magnetic field detection element, the first and second magnets being fixed to the other one of the movable member and the support member, a storage unit that stores first data indicating a relationship between the movement amount of the movable member in the first direction and magnetic field information detected by the first magnetic field detection element, stores the first data in association with each of a plurality of positions of the movable member in the second direction, and stores second data indicating a relationship between the movement amount of the movable member in the second direction and magnetic field information detected by the second magnetic field detection element, and a position detection unit that detects a position of the movable member in the second direction by using the second data, and detects a position of the movable member in the first direction based on the position, the first data, and the magnetic field information detected by the first magnetic field detection element.

Although various embodiments have been described with reference to the drawings, the present invention is not limited to such examples. It is clear that those skilled in the art can conceive various changes or modifications within the scope described in the claims, and it should be understood that these changes and modifications belong to the technical scope of the present invention. Each component in the aforementioned embodiment may be arbitrarily combined without departing from the spirit of the invention.

This application is based on a Japanese patent application filed on Dec. 28, 2017 (Japanese Patent Application No. 2017-254229), the contents of which are incorporated herein by reference.

The present invention is highly convenient and effective by being applied to a digital camera such as a single-lens reflex camera or a mirrorless camera, an in-vehicle camera, a surveillance camera, or a smartphone.

EXPLANATION OF REFERENCES

100: digital camera
101: imaging lens
20: imaging element
3: image shake correction mechanism
104: AFE
105: imaging element drive unit
106: motion detection sensor
107: image processing unit
108: system controller
109: memory
K: optical axis
1: support member
1A: first support member
Mh1: X-axis position detection magnet
Mh2: Y-axis rotation position detection magnet
Mh3: Y-axis rotation position detection magnet
$1s$, $2s$, $3s$: S-pole
$1n$, $2n$, $3n$: N-pole
Mv1: X-axis rotation drive magnet
Mv2: X-axis rotation drive magnet
Mv3: Y-axis drive magnet
1B: second support member
mv1: X-axis rotation drive magnet
mv2: X-axis rotation drive magnet
mv3: Y-axis drive magnet
2: movable member
C1: X-axis rotation drive coil
C2: X-axis rotation drive coil
C3: Y-axis drive coil
21: circuit board
H1: X-axis position detection Hall element
H2: Y-axis rotation position detection Hall element
H3: Y-axis rotation position detection Hall element
$24a$, $24b$, $24c$: spring
$20a$: light receiving surface
P: center of light receiving surface
R: rotation axis
10: base
$11a$, $11b$: through-hole
12, 14: yoke
13: coupling member
$15a$, $15b$, $15c$: flat surface
$16a$, $16b$, $16c$: hook
$17a$, $17b$, $17c$: projecting portion
18: yoke
$19a$: hole portion
$19b$, $19c$: notch portion
SC1, SC2, SC3, SC4: screw
$21a$, $21b$, $21c$: connector
22: base
$23a$, $23b$, $23c$: hook
25, 26, 27: flexible print substrate
$25a$, $26a$: first portion
$25b$, $26b$: folded portion
$27a$: fixed portion
$27b$: non-fixed portion
28A, 28A: attachment portion
$28a$, $28b$: insertion member
$280a$, $280b$: flat plate portion
$29a$, $29b$, $29c$: bottom surface
$290a$, $290b$, $290c$: recess portion
11, 12, 13: straight line
G1: output characteristic curve
RG: detection range
RG1, RG2, RG3: division region
L1, L2, L3: straight line
DS1 to DS9: data set
200: smartphone
201: casing 202: display panel
203: operation panel
204: display input unit
205: speaker
206: microphone
207: operation unit
208: camera unit
210: wireless communication unit
211: call handling unit
212: storage unit
213: external input and output unit
214: GPS reception unit
215: motion sensor unit
216: power supply unit
217: internal storage unit
218: external storage unit
220: main controller
ST1 to STn: GPS satellites

What is claimed is:

1. An image shake correction device comprising:
a movable member to which a lens or an imaging element is fixed;
a support member that supports the movable member in a manner where the movable member is movable in a first direction and a second direction perpendicular to each other along a plane;
a first magnetic field detection element that detects a movement amount of the movable member in the first direction and a second magnetic field detection element that detects a movement amount of the movable member in the second direction, the first magnetic field detection element and the second magnetic field detection element being fixed to one of the movable member and the support member;
a first magnet that faces the first magnetic field detection element, and a second magnet that faces the second magnetic field detection element, the first magnet and the second magnet being fixed to the other one of the movable member and the support member;
a storage unit that stores a relationship between the movement amount of the movable member in the first direction and magnetic field information detected by the first magnetic field detection element, as a first set of linear functions corresponding to each division region in a case where a detection range of the magnetic field information detected by the first magnetic field detection element is divided into a plurality of division regions, stores the first set in association with each of a plurality of positions of the movable member in the second direction, and stores a relationship between the movement amount of the movable member in the second direction and magnetic field information detected by the second magnetic field detection element, as a second set of linear functions corresponding to each division region in a case where a detection range of the magnetic field information detected by the second magnetic field detection element is divided into a plurality of division regions; and
a position detection unit that detects a position of the movable member in the second direction by using the magnetic field information detected by the second magnetic field detection element and the linear functions of the second set corresponding to the division region to which the magnetic field information belongs, and detects a position of the movable member in the first direction based on the position of the movable member in the second direction, the first set, and the magnetic field information detected by the first magnetic field detection element.

2. The image shake correction device according to claim 1,
wherein, in a case where the detected position of the movable member in the second direction does not match each of the plurality of positions in the second direction, the position detection unit detects the position of the movable member in the first direction by using the linear functions, which are included in the first set corresponding to a position closest to the position of the movable member in the second direction among the plurality of positions in the second direction and correspond to the division region to which the magnetic field information detected by the first magnetic field detection element belongs, and the magnetic field information detected by the first magnetic field detection element.

3. The image shake correction device according to claim 1,
wherein, in a case where the detected position of the movable member in the second direction does not match each of the plurality of positions in the second direction, the position detection unit calculates a first movement amount of the movable member in the first direction by using the linear functions, which are included in the first set corresponding to one of two positions close to the position of the movable member in the second direction among the plurality of positions in the second direction and correspond to the division region to which the magnetic field information detected by the first magnetic field detection element belongs, and the magnetic field information detected by the first magnetic field detection element, calculates a second movement amount of the movable member in the first direction by using the linear functions, which are included in the first set corresponding to the other one of the two positions and correspond to the division region to which the magnetic field information detected by the first magnetic field detection element belongs, and the magnetic field information detected by the first magnetic field detection element, and detects the position of the movable member in the first direction based on a movement amount obtained by averaging the first movement amount and the second movement amount.

4. The image shake correction device according to claim 1,
wherein, in a case where the detected position of the movable member in the second direction matches each of the plurality of positions in the second direction, the position detection unit detects the position of the movable member in the first direction by using the linear functions, which are included in the first set corresponding to the matched position and correspond to the division region to which the magnetic field information detected by the first magnetic field detection element belongs, and the magnetic field information detected by the first magnetic field detection element.

5. The image shake correction device according to claim 1, further comprising:
a plurality of drive magnets that is fixed to the other one of the movable member and the support member, and moves the movable member in the first direction and the second direction,
wherein the first magnet is disposed to be closer to the drive magnets than the second magnet.

6. The image shake correction device according to claim 1,
wherein the storage unit stores the second set in association with each of a plurality of positions of the movable member in the first direction, and
the position detection unit provisionally decides the position of the movable member in the second direction by using the magnetic field information detected by the second magnetic field detection element and the linear functions, which are included in any one of the second sets for the plurality of positions in the first direction and correspond to the division region to which the magnetic field information belongs, detects the position of the movable member in the first direction based on the provisionally decided position of the movable member in the second direction, the first set, and the magnetic field information detected by the first magnetic field detection element, and detects the position of the movable member in the second direction based on the position of the movable member in the first direction, the second set, and the magnetic field information detected by the second magnetic field detection element.

7. The image shake correction device according to claim 1,
wherein the first set and the second set of the linear functions stored in the storage unit include a plurality of types of sets in which a total number of linear functions is different,
the imaging element is fixed to the movable member, and
the position detection unit detects the position of the movable member by using a set corresponding to a type of a lens disposed in association with the imaging element among the plurality of types of sets.

8. An imaging device comprising the image shake correction device according to claim 1.

9. A position detection method of detecting a position of a movable member in an image shake correction device that includes the movable member to which a lens or an imaging element is fixed, a support member that supports the movable member in a manner where the movable member is movable in a first direction and a second direction perpendicular to each other along a plane, a first magnetic field detection element that detects a movement amount of the movable member in the first direction and a second magnetic field detection element that detects a movement amount of the movable member in the second direction, the first magnetic field detection element and the second magnetic field detection element being fixed to one of the movable member and the support member, and a first magnet that faces the first magnetic field detection element, and a second magnet that faces the second magnetic field detection element, the first magnet and the second magnet being fixed to the other one of the movable member and the support member, the method comprising:
a position detection step of reading out a second set of linear functions from a storage unit that stores a relationship between the movement amount of the movable member in the first direction and magnetic field information detected by the first magnetic field detection element, as a first set of linear functions corresponding to each division region in a case where a detection range of the magnetic field information detected by the first magnetic field detection element is divided into a plurality of division regions, stores the first set in association with each of a plurality of positions of the movable member in the second direction, and stores a relationship between the movement amount of the movable member in the second direction and magnetic field information detected by the second magnetic field detection element, as the second set of the linear functions corresponding to each division region in a case where a detection range of the magnetic field information detected by the second magnetic field detection element is divided into a plurality of division regions, detecting a position of the movable member in the second direction by using the magnetic field information detected by the second magnetic field detection element and the linear functions of the second set corresponding to the division region to which the magnetic field information belongs, and detecting a position of the movable member in the first direction based on the position of the movable member in the second direction, the first set read out from the storage unit, and the magnetic field information detected by the first magnetic field detection element.

10. The position detection method according to claim 9,
wherein, in the position detection step, in a case where the detected position of the movable member in the second direction does not match each of the plurality of positions in the second direction, the position of the movable member in the first direction is detected by using the linear functions, which are included in the first set corresponding to a position closest to the position of the movable member in the second direction among the plurality of positions in the second direction and correspond to the division region to which the magnetic field information detected by the first magnetic field detection element belongs, and the magnetic field information detected by the first magnetic field detection element.

11. The position detection method according to claim 9,
wherein, in the position detection step, in a case where the detected position of the movable member in the second direction does not match each of the plurality of positions in the second direction, a first position of the movable member in the first direction is calculated by using the linear functions, which are included in the first set corresponding to one of two positions close to the position of the movable member in the second direction among the plurality of positions in the second direction and correspond to the division region to which the magnetic field information detected by the first magnetic field detection element belongs, and the magnetic field information detected by the first magnetic field detection element, a second position of the movable member in the first direction is calculated by using the linear functions, which are included in the first set corresponding to the other one of the two positions and correspond to the division region to which the magnetic field information detected by the first magnetic field detection element belongs, and the magnetic field information detected by the first magnetic field detection element, and a position between the first position and the second position is detected as the position of the movable member in the first direction.

12. The position detection method according to claim 9,
wherein, in the position detection step, in a case where the detected position of the movable member in the second direction matches each of the plurality of positions in the second direction, the position of the movable member in the first direction is detected by using the linear functions, which are included in the first set corresponding to the matched position and correspond to the division region to which the magnetic field information detected by the first magnetic field detection element belongs, and the magnetic field information detected by the first magnetic field detection element.

13. The position detection method according to claim 9, wherein the image shake correction device further comprises a plurality of drive magnets that is fixed to the other one of the movable member and the support member, and moves the movable member in the first direction and the second direction, and the first magnet is disposed to be closer to the drive magnets than the second magnet.

14. The position detection method according to claim 9, wherein the storage unit stores the second set in association with each of a plurality of positions of the movable member in the first direction, and, in the position detection step, the position of the movable member in the second direction is provisionally decided by using the magnetic field information detected by the second magnetic field detection element and the linear functions, which are included in any one of the second sets for the plurality of positions in the first direction and correspond to the division region to which the magnetic field information belongs, the position of the movable member in the first direction is detected based on the provisionally decided position of the movable member in the second direction, the first set, and the magnetic field information detected by the first magnetic field detection element, and the position of the movable member in the second direction is detected based on the position of the movable member in the first direction, the second set, and the magnetic field information detected by the second magnetic field detection element.

15. The position detection method according to claim 9, wherein the first set and the second set of the linear functions stored in the storage unit include a plurality of types of sets in which a total number of linear functions is different, the imaging element is fixed to the movable member, and, in the position detection step, the position of the movable member is detected by using a set corresponding to a type of a lens disposed in association with the imaging element among the plurality of types of sets.

16. A non-transitory computer readable medium storing a position detection program causing a computer to detect a position of a movable member in an image shake correction device that includes the movable member to which a lens or an imaging element is fixed, a support member that supports the movable member in a manner where the movable member is movable in a first direction and a second direction perpendicular to each other along a plane, a first magnetic field detection element that detects a movement amount of the movable member in the first direction and a second magnetic field detection element that detects a movement amount of the movable member in the second direction, the first magnetic field detection element and the second magnetic field detection element being fixed to one of the movable member and the support member, and a first magnet that faces the first magnetic field detection element, and a second magnet that faces the second magnetic field detection element, the first magnet and the second magnet being fixed to the other one of the movable member and the support member, the program causing the computer to execute:

a position detection step of reading out a second set of linear functions from a storage unit that stores a relationship between the movement amount of the movable member in the first direction and magnetic field information detected by the first magnetic field detection element, as a first set of linear functions corresponding to each division region in a case where a detection range of the magnetic field information detected by the first magnetic field detection element is divided into a plurality of division regions, stores the first set in association with each of a plurality of positions of the movable member in the second direction, and stores a relationship between the movement amount of the movable member in the second direction and magnetic field information detected by the second magnetic field detection element, as the second set of the linear functions corresponding to each division region in a case where a detection range of the magnetic field information detected by the second magnetic field detection element is divided into a plurality of division regions, detecting a position of the movable member in the second direction by using the magnetic field information detected by the second magnetic field detection element and the linear functions of the second set corresponding to the division region to which the magnetic field information belongs, and detecting a position of the movable member in the first direction based on the position of the movable member in the second direction, the first set read out from the storage unit, and the magnetic field information detected by the first magnetic field detection element.

* * * * *